US012807418B2

(12) United States Patent
Velagapudi et al.

(10) Patent No.: US 12,807,418 B2
(45) Date of Patent: Nov. 24, 2026

(54) SYSTEMS AND METHODS FOR PROVIDING ORDER FULFILLMENT USING A CONVEYOR TAKEAWAY SYSTEM

(71) Applicant: Berkshire Grey Operating Company, Inc., Bedford, MA (US)

(72) Inventors: Prasanna Velagapudi, Pittsburgh, PA (US); Joseph Romano, Arlington, MA (US); Christopher Geyer, Arlington, MA (US); Guoming Alex Long, Wexford, PA (US); Thomas Allen, Reading, MA (US); Christopher Buck, Stow, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 157 days.

(21) Appl. No.: 18/828,076

(22) Filed: Sep. 9, 2024

(65) Prior Publication Data

US 2024/0425289 A1 Dec. 26, 2024

Related U.S. Application Data

(63) Continuation of application No. 17/193,378, filed on Mar. 5, 2021, now Pat. No. 12,129,125.

(Continued)

(51) Int. Cl.

*B65G 1/04* (2006.01)
*B25J 9/00* (2006.01)

(Continued)

(52) U.S. Cl.

CPC ............ *B65G 21/18* (2013.01); *B25J 9/0093* (2013.01); *B25J 15/00* (2013.01); *B65G 1/0464* (2013.01);

(Continued)

(58) Field of Classification Search

CPC .... B65G 21/18; B65G 1/0464; B65G 1/0485; B65G 1/1371; B65G 47/68; B65G 47/90;

(Continued)

(56) References Cited

U.S. PATENT DOCUMENTS

| | | |
|---|---|---|
| 3,750,804 A | 8/1973 | Lemelson |
| 3,951,276 A | 4/1976 | Moses |

(Continued)

FOREIGN PATENT DOCUMENTS

| | | |
|---|---|---|
| CA | 3043018 A1 | 5/2018 |
| CA | 3057334 A1 | 9/2018 |

(Continued)

OTHER PUBLICATIONS

Annex to Form PCT/ISA/206, Communication Relating to the Results of the Partial International Search and Provisional Opinion Accompanying the Partial Search Result issued by the International Searching Authority, the European Patent Office, in related International Application No. PCT/US2021/021140 on Jul. 6, 2021, 2 pages.

(Continued)

*Primary Examiner* — Thomas Randazzo
(74) *Attorney, Agent, or Firm* — Gesmer Updegrove LLP

(57) ABSTRACT

A storage, retrieval and processing system for processing objects is disclosed that includes a plurality of bins including objects to be distributed by the storage, retrieval and processing system, the plurality of bins being provided on an input conveyance system, a programmable motion device that includes an end effector for grasping and moving any of the objects, a perception system for providing perception data regarding a selected object that is presented to the perception system by the programmable motion device, and a routing conveyance system for receiving the selected object, and for moving the selected object in each of (Continued)

horizontal and vertical directions toward a destination container responsive to the perception data, the destination container being provided among a plurality of destination containers in a row that are provided as a set on a destination conveyance system.

26 Claims, 20 Drawing Sheets

Related U.S. Application Data

(60) Provisional application No. 62/986,443, filed on Mar. 6, 2020.

(51) Int. Cl.

| | |
|---|---|
| ***B25J 15/00*** | (2006.01) |
| ***B65G 1/137*** | (2006.01) |
| ***B65G 13/04*** | (2006.01) |
| ***B65G 21/18*** | (2006.01) |
| ***B65G 47/68*** | (2006.01) |
| ***B65G 47/90*** | (2006.01) |
| ***G06K 7/14*** | (2006.01) |

(52) U.S. Cl.
CPC ......... *B65G 1/0485* (2013.01); *B65G 1/1371* (2013.01); *B65G 1/1378* (2013.01); *B65G 47/68* (2013.01); *B65G 47/90* (2013.01); *G06K 7/1404* (2013.01); *B65G 13/04* (2013.01); *B65G 2203/0208* (2013.01); *B65G 2203/04* (2013.01)

(58) Field of Classification Search
CPC ............ B65G 13/04; B65G 2203/0208; B65G 2203/04; B65G 47/914; B65G 47/917; B65G 61/00; B65G 1/1378; B25J 9/0093; B25J 15/00; G06K 7/1404
See application file for complete search history.

(56) References Cited

U.S. PATENT DOCUMENTS 4,542,808 A 9/1985 Lloyd, Jr. et al.
4,622,875 A 11/1986 Emery et al.
4,678,390 A 7/1987 Bonneton et al.
4,722,653 A 2/1988 Williams et al.
4,815,582 A 3/1989 Canziani
4,846,335 A 7/1989 Hartlepp
4,895,242 A 1/1990 Michel
5,190,162 A 3/1993 Harlepp
5,271,703 A 12/1993 Lindqvist et al.
5,595,263 A 1/1997 Pignataro
5,647,473 A 7/1997 Miller et al.
5,794,789 A 8/1998 Payson et al.
5,875,434 A 2/1999 Matsuoka et al.
6,006,946 A 12/1999 Williams et al.
6,076,023 A 6/2000 Sato
6,189,702 B1 2/2001 Bonnet
6,208,908 B1 3/2001 Boyd et al.
6,246,023 B1 6/2001 Kugle
6,377,867 B1 4/2002 Bradley et al.
6,505,093 B1 1/2003 Thatcher et al.
6,513,641 B1 2/2003 Affaticati et al.
6,688,459 B1 2/2004 Bonham et al.
6,705,528 B2 3/2004 Good et al.
6,762,382 B1 7/2004 Danelski
7,861,844 B2 1/2011 Hayduchok et al.
8,397,897 B2 * 3/2013 Bastian, II ............ B65G 47/82 414/277
8,718,814 B1 5/2014 Clark et al.
8,776,694 B2 7/2014 Rosenwinkel et al.
8,798,784 B1 8/2014 Clark et al.
8,851,272 B1 * 10/2014 Hill ........................ B65G 13/11 198/606
9,020,632 B2 4/2015 Naylor
9,272,845 B2 3/2016 Honkanen et al.
9,364,865 B2 6/2016 Kim
9,481,518 B2 11/2016 Neiser
9,694,977 B2 7/2017 Aprea et al.
9,937,532 B2 4/2018 Wagner et al.
9,975,148 B2 5/2018 Zhu et al.
10,007,827 B2 6/2018 Wagner et al.
10,029,865 B1 7/2018 McCalib, Jr. et al.
10,086,998 B1 10/2018 Tilekar et al.
10,438,034 B2 10/2019 Wagner et al.
10,518,974 B2 12/2019 Lee et al.
10,577,180 B1 3/2020 Mehta et al.
10,596,696 B2 3/2020 Wagner et al.
10,632,610 B2 4/2020 Wagner et al.
10,649,445 B2 5/2020 Wagner et al.
10,730,077 B2 8/2020 Wagner et al.
10,843,333 B2 11/2020 Wagner et al.
10,894,674 B2 1/2021 Wagner et al.
10,906,740 B2 2/2021 Wagner et al.
11,020,770 B1 6/2021 Tilekar et al.
11,338,999 B2 5/2022 Hu
11,472,633 B2 10/2022 Wagner et al.
2002/0091801 A1 7/2002 Lewin et al.
2002/0179400 A1 * 12/2002 Dersham ................ B65G 13/04 193/1
2002/0179502 A1 12/2002 Cerutti et al.
2003/0218307 A1 11/2003 Anderson et al.
2005/0002762 A1 1/2005 Gambarelli et al.
2006/0045672 A1 3/2006 Maynard et al.
2008/0181753 A1 7/2008 Bastian et al.
2009/0129902 A1 5/2009 Schafer
2010/0036675 A1 2/2010 Schäfer
2010/0096243 A1 4/2010 Balk
2010/0300842 A1 * 12/2010 Bastian, II ............. B65G 47/82 198/586
2010/0316469 A1 12/2010 Lert et al.
2011/0056806 A1 3/2011 Johnson
2011/0144798 A1 6/2011 Freudelsperger
2011/0262253 A1 10/2011 Krizmanic et al.
2012/0029687 A1 2/2012 Hagen et al.
2012/0128454 A1 5/2012 Hayduchok et al.
2012/0177465 A1 7/2012 Koholka
2012/0328397 A1 12/2012 Yamashita
2013/0051696 A1 2/2013 Garrett et al.
2014/0031972 A1 1/2014 DeWitt et al.
2014/0056672 A1 2/2014 Mathys et al.
2014/0086714 A1 3/2014 Malik
2014/0142746 A1 5/2014 Vegh et al.
2014/0212257 A1 7/2014 Yamashita
2014/0244026 A1 8/2014 Neiser
2014/0277692 A1 9/2014 Buzan et al.
2014/0277693 A1 9/2014 Naylor
2014/0288696 A1 9/2014 Lert
2015/0098775 A1 4/2015 Razumov
2015/0294260 A1 10/2015 Napoli
2016/0107848 A1 4/2016 Baker
2016/0122135 A1 5/2016 Bastian, II
2016/0221757 A1 8/2016 DeWitt et al.
2016/0355337 A1 12/2016 Lert et al.
2017/0015502 A1 1/2017 Engel et al.
2017/0043953 A1 2/2017 Battles et al.
2017/0057756 A1 3/2017 Dugat et al.
2017/0136632 A1 5/2017 Wagner et al.
2017/0173638 A1 6/2017 Wagner et al.
2017/0267452 A1 9/2017 Goren et al.
2017/0330135 A1 11/2017 Taylor et al.
2017/0349385 A1 12/2017 Maroni et al.
2018/0037410 A1 2/2018 DeWitt
2018/0057264 A1 3/2018 Wicks et al.
2018/0075402 A1 3/2018 Stadie et al.
2018/0085788 A1 3/2018 Engel
2018/0105363 A1 4/2018 Lisso
2018/0208397 A1 7/2018 Schack et al.
2018/0251302 A1 9/2018 Valinsky et al.
2018/0265311 A1 9/2018 Wagner et al.
2018/0273296 A1 9/2018 Wagner et al.

(56) References Cited

U.S. PATENT DOCUMENTS

| | | | | |
|---|---|---|---|---|
| 2018/0273298 | A1 | 9/2018 | Wagner et al. | |
| 2018/0282066 | A1 | 10/2018 | Wagner et al. | |
| 2018/0290830 | A1 | 10/2018 | Valinsky et al. | |
| 2018/0327198 | A1* | 11/2018 | Wagner | B65G 47/90 |
| 2018/0354719 | A1 | 12/2018 | Hoffman | |
| 2019/0218033 | A1 | 7/2019 | Muttathil et al. | |
| 2019/0329979 | A1 | 10/2019 | Wicks et al. | |
| 2020/0005005 | A1 | 1/2020 | Wagner et al. | |
| 2020/0016746 | A1 | 1/2020 | Yap et al. | |
| 2020/0039745 | A1 | 2/2020 | Khodl et al. | |
| 2020/0152259 | A1 | 5/2020 | DeWitt et al. | |
| 2020/0265380 | A1 | 8/2020 | Dubois et al. | |
| 2020/0302390 | A1 | 9/2020 | Elazary et al. | |
| 2020/0407178 | A1 | 12/2020 | Battles et al. | |
| 2021/0039140 | A1 | 2/2021 | Geyer et al. | |
| 2021/0039881 | A1 | 2/2021 | Zhu et al. | |
| 2021/0039887 | A1 | 2/2021 | Zhu et al. | |
| 2021/0047117 | A1 | 2/2021 | Stevens et al. | |
| 2021/0047118 | A1 | 2/2021 | Stevens et al. | |
| 2021/0276796 | A1 | 9/2021 | Long | |
| 2021/0276797 | A1 | 9/2021 | Velagapudi et al. | |
| 2021/0276798 | A1 | 9/2021 | Velagapudi et al. | |
| 2021/0276799 | A1 | 9/2021 | Velagapudi et al. | |
| 2021/0300685 | A1 | 9/2021 | Dieges et al. | |
| 2021/0394807 | A1 | 12/2021 | Kontuniemi et al. | |
| 2022/0089387 | A1 | 3/2022 | Dederichs et al. | |
| 2022/0234825 | A1 | 7/2022 | Krishnamoorthy et al. | |
| 2022/0284393 | A1 | 9/2022 | Al et al. | |
| 2022/0356017 | A1 | 11/2022 | Romano et al. | |
| 2023/0077893 | A1 | 3/2023 | Gebhardt et al. | |
| 2023/0112778 | A1 | 4/2023 | O'Hern et al. | |
| 2023/0119061 | A1 | 4/2023 | Halamka et al. | |
| 2023/0137545 | A1 | 5/2023 | Austrheim | |
| 2023/0150770 | A1 | 5/2023 | Sebastian | |
| 2023/0219767 | A1 | 7/2023 | Demir et al. | |
| 2023/0249914 | A1 | 8/2023 | Fosnight et al. | |
| 2023/0271785 | A1 | 8/2023 | Gravelle et al. | |
| 2023/0331475 | A1 | 10/2023 | Yamashita | |

FOREIGN PATENT DOCUMENTS

| | | | | |
|---|---|---|---|---|
| CN | 102001506 | A | 4/2011 | |
| CN | 102264602 | A | 11/2011 | |
| CN | 103332426 | A | 10/2013 | |
| CN | 104169196 | A | 11/2014 | |
| CN | 104859990 | A | 8/2015 | |
| CN | 104925440 | A | 9/2015 | |
| CN | 205257168 | U | 5/2016 | |
| CN | 105858042 | A | 8/2016 | |
| CN | 205820147 | U | 12/2016 | |
| CN | 104495181 | B | 2/2017 | |
| CN | 206456846 | U | 9/2017 | |
| CN | 107635896 | A | 1/2018 | |
| CN | 107720072 | A | 2/2018 | |
| CN | 108146948 | A | 6/2018 | |
| CN | 108700869 | A | 10/2018 | |
| CN | 109081027 | A | 12/2018 | |
| CN | 110062740 | A | 7/2019 | |
| CN | 110325462 | A | 10/2019 | |
| CN | 209506761 | U | 10/2019 | |
| CN | 110431097 | A | 11/2019 | |
| CN | 110461734 | A | 11/2019 | |
| CN | 110462657 | A | 11/2019 | |
| CN | 209720654 | U | 12/2019 | |
| CN | 110662707 | A | 1/2020 | |
| CN | 110691742 | A | 1/2020 | |
| CN | 110740954 | A | 1/2020 | |
| CN | 110803439 | A | 2/2020 | |
| CN | 115210152 | A | 10/2022 | |
| CN | 115243987 | A | 10/2022 | |
| CN | 115243988 | A | 10/2022 | |
| CN | 117255718 | A | 12/2023 | |
| CN | 118139798 | A | 6/2024 | |
| DE | 102004014378 | A1 | 10/2005 | |
| DE | 102008046325 | A1 | 3/2010 | |
| EP | 1151942 | A2 | 11/2001 | |
| EP | 2818433 | A1 | 12/2014 | |
| EP | 3354598 | A1 | 8/2018 | |
| EP | 3572355 | A1 | 11/2019 | |
| EP | 4114766 | A2 | 1/2023 | |
| EP | 4114767 | A1 | 1/2023 | |
| EP | 4114768 | A1 | 1/2023 | |
| EP | 4114769 | A1 | 1/2023 | |
| EP | 4334045 | A2 | 3/2024 | |
| JP | 2013052958 | A | 3/2013 | |
| TW | 201300298 | A | 1/2013 | |
| WO | 2007009136 | A1 | 1/2007 | |
| WO | WO-2009089159 | A2 * | 7/2009 | B65G 47/82 |
| WO | 2010040809 | A1 | 4/2010 | |
| WO | 2011012611 | A1 | 2/2011 | |
| WO | 2012106744 | A1 | 8/2012 | |
| WO | 2014080041 | A1 | 5/2014 | |
| WO | 2016105201 | A2 | 6/2016 | |
| WO | 2017123678 | A1 | 7/2017 | |
| WO | 2018175466 | A1 | 9/2018 | |
| WO | 2018195196 | A1 | 10/2018 | |
| WO | 2021026359 | A1 | 2/2021 | |
| WO | 2021178819 | A1 | 9/2021 | |
| WO | 2021178826 | A1 | 9/2021 | |
| WO | 2021178830 | A1 | 9/2021 | |
| WO | 2022236038 | A2 | 11/2022 | |
| WO | 2023064465 | A1 | 4/2023 | |

OTHER PUBLICATIONS

Annex to Form PCT/ISA/206, Communication Relating to the Results of the Partial International Search issued by the European Patent Office, as the International Searching Authority, in related International Application No. PCT/US2022/028047 on Sep. 22, 2022, 2 pages.

Chapter 5 High-bay Warehouses and equipment thereof of Modern Machinery and Equipment Design Manual, vol. 3, Non-Standard Machinery and Equipment Design, edited by Fan Zuyao, pp. 16-261, China Machine Press, Oct. 1996, 7 pages.

Chinese Thesis of Zhang et al., Warehouse Management Practices, Aviation Industry Press, Jan. 2012, pp. 56-59, 15 pages including the English translation prepared by Shanghai Patent & Trademark Law Office, LLC.

Communication pursuant to Rules 161(1) and 162 EPC issued by the European Patent Office in related European Patent Application No. 21714592.9 on Oct. 13, 2022, 3 pages.

Communication pursuant to Rules 161(1) and 162 EPC issued by the European Patent Office in related European Patent Application No. 21714588.7 on Oct. 13, 2022, 3 pages.

Communication pursuant to Rules 161(1) and 162 EPC issued by the European Patent Office in related European Patent Application No. 21714590.3 on Oct. 13, 2022, 3 pages.

Communication pursuant to Rules 161(1) and 162 EPC issued by the European Patent Office in related European Patent Application No. 21715372.5 on Oct. 13, 2022, 3 pages.

Communication pursuant to Rules 161(1) and 162 EPC issued by the European Patent Office in related European Patent Application No. 22727547.6 on Dec. 14, 2023, 3 pages.

Communication pursuant to Rules 161(1) and 162 EPC issued by the European Patent Office in related European Patent Application No. 22809552.7 on May 22, 2024, 3 pages.

Decision on Rejection, along with its English translation, issued by the China National Intellectual Property Administration in related Chinese Patent Application No. 202180018310.4 on Sep. 13, 2024, 33 pages.

Examiner's Report issued by the Innovation, Science and Economic Development Canada (Canadian Intellectual Property Office) in related Canadian Patent Application No. 3,174,544 on Nov. 6, 2023, 4 pages.

Examiner's Report issued by the Innovation, Science and Economic Development Canada (Canadian Intellectual Property Office) in related Canadian Patent Application No. 3,174,546 on Nov. 7, 2023, 4 pages.

(56) References Cited

OTHER PUBLICATIONS

Examiner's Report issued by the Innovation, Science and Economic Development Canada (Canadian Intellectual Property Office) in related Canadian Patent Application No. 3,174,543 on Nov. 6, 2023, 4 pages.
Examiner's Report issued by the Innovation, Science and Economic Development Canada (Canadian Intellectual Property Office) in related Canadian Patent Application No. 3,174,552 on Nov. 29, 2023, 6 pages.
Final Office Action issued by the United States Patent and Trademark Office in related U.S. Appl. No. 17/193,377 on Oct. 16, 2024, 27 pages.
International Preliminary Report on Patentability and the International Preliminary Report on Patentability issued by the International Bureau of WIPO in related International Application No. PCT/US2021/021118 on Sep. 6, 2022, 9 pages.
International Preliminary Report on Patentability issued by the International Bureau of WIPO in related International Application No. PCT/US2021/021128 on Sep. 6, 2022, 8 pages.
International Preliminary Report on Patentability issued by the International Bureau of WIPO in related International Application No. PCT/US2021/021133 on Sep. 6, 2022, 7 pages.
International Preliminary Report on Patentability issued by the International Bureau of WIPO in related International Application No. PCT/US2021/021140 on Sep. 15, 2022, 10 pages.
International Preliminary Report on Patentability issued by the International Bureau of WIPO in related International application No. PCT/US2022/028047 on Oct. 24, 2023, 14 pages.
International Preliminary Report on Patentability issued by the International Bureau of WIPO in related international application No. PCT/US2022/046561 on Apr. 16, 2024, 7 pages.
International Search Report and the Written Opinion of the International Searching Authority, or the Declaration, and the International Search Report and Written Opinion of the International Searching Authority (the European Patent Office) issued in related International Application No. PCT/US2022/028047 on Nov. 14, 2022; 20pgs.
International Search Report and Written Opinion issued by the International Searching Authority (the European Patent Office) in related International Application No. PCT/US2021/021128 on Jun. 21, 2021, 12 pages.
International Search Report and Written Opinion issued by the International Searching Authority (the European Patent Office) in related International Application No. PCT/US2021/021140 on Sep. 3, 2021, 16 pages.
International Search Report and Written Opinion of the International Searching Authority, the European Patent Office, issued in related International Application No. PCT/US2021/021118 on Jul. 16, 2021, 12 pages.
International Search Report and Written Opinion of the International Searching Authority issued by the European Patent Office in related International Application No. PCT/US2021/021133 on Jun. 21, 2021, 11 pages.
International Search Report and Written Opinion of the International Searching Authority, the European Patent Office, issued in related International Application No. PCT/US2022/046561 on Feb. 13, 2023, 13 pages.
Non-Final Office Action issued by the United States Patent and Trademark Office in related U.S. Appl. No. 17/193,378 on Aug. 4, 2023, 26 pages.
Non-Final Office Action issued by the United States Patent and Trademark Office in related U.S. Appl. No. 17/193,377 on Mar. 21, 2024, 44 pages.
Non-Final Office Action issued by the United States Patent and Trademark Office in related U.S. Appl. No. 17/193,380 on Mar. 27, 2024, 40 pages.
Non-Final Office Action issued by the United States Patent and Trademark Office in related U.S. Appl. No. 17/193,384 on Apr. 5, 2024, 38 pages.
Non-Final Office Action issued by the United States Patent and Trademark Office in related U.S. Appl. No. 17/965,420 on Nov. 18, 2024, 11 pages.
Notice of First Office Action, along with its English translation, issued by the China National Intellectual Property Office in related Chinese Patent Application No. 202180018333.5 on Mar. 31, 2023, 32 pages.
Notice of First Office Action, along with its English translation, issued by the China National Intellectual Property Office in related Chinese Patent Application No. 202180018436.1 on Mar. 31, 2023, 17 pages.
Notice of Third Office Action, along with its English translation, issued by the China National Intellectual Property Administration in related Chinese Patent Application No. 202180018310.4 on Apr. 17, 22 pages.
Notice of Third Office Action, along with its English translation, issued by the China National Intellectual Property Administration in related Chinese Patent Application No. 202180018333.5 on Apr. 17, 31 pages.
Notice of Third Office Action, along with its English translation, issued by the China National Intellectual Property Administration in related Chinese Patent Application No. 202180018364.0 on Apr. 17, 2024, 24 pages.
Notice on the First Office Action, along with its English translation, issued by the China National Intellectual Property Administration, in related Chinese Patent Application No. 202180018364.0 on Mar. 30, 2023, 23 pages.
Notice on the First Office Action, along with its English translation, issued by the China National Intellectual Property Administration, in related Chinese Patent Application No. 202180018310.4 on Mar. 30, 2023, 21 pages.
Notice on the Second Office Action, along with its English translation, issued by the China National Intellectual Property Administration in related Chinese Patent Application No. 202180018310.4 on Oct. 11, 2023, 24 pages.
Notice on the Second Office Action, along with its English translation, issued by the China National Intellectual Property Administration in related Chinese Patent Application No. 202180018333.5 on Oct. 12, 2023, 35 pages.
Notice on the Second Office Action, along with its English translation, issued by the China National Intellectual Property Administration in related Chinese Patent Application No. 202180018364.0 on Oct. 11, 2023, 19 pages.

* cited by examiner

SYSTEMS AND METHODS FOR PROVIDING ORDER FULFILLMENT USING A CONVEYOR TAKEAWAY SYSTEM

PRIORITY

The present application is a continuation of U.S. patent application Ser. No. 17/193,378, filed Mar. 5, 2021, which claims priority to U.S. Provisional Patent Application No. 62/986,443, filed Mar. 6, 2020, the disclosures of which are hereby incorporated by reference in their entireties.

BACKGROUND

The present invention relates to order fulfillment systems, and relates in particular to systems for providing aggregation of objects (e.g., products, packages, bags, items, goods, etc.) for preparation for shipment to destination locations, such as in Automated Storage and Retrieval Systems.

Order fulfillment systems typically involve the processing of a wide variety of objects for distribution to a large number of distribution locations, such as intermediate distribution stations, mail order stations, geographic group locations and address specific locations. Automated storage and retrieval systems (AS/RS) generally include computer controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an aspect, the invention provides a storage, retrieval and processing system for processing objects that includes a plurality of bins including objects to be distributed by the storage, retrieval and processing system, the plurality of bins being provided on an input conveyance system, a programmable motion device that includes an end effector for grasping and moving any of the objects, the programmable motion device being capable of reaching any of the objects within at least one of the plurality of bins in an input area of the conveyance system, a perception system for providing perception data regarding a selected object that is presented to the perception system by the programmable motion device, and a routing conveyance system for receiving the selected object, and for moving the selected object in each of horizontal and vertical directions toward a destination container responsive to the perception data, the destination container being provided among a plurality of destination containers in a row that are provided as a set on a destination conveyance system.

In accordance with another aspect, the invention provides a storage, retrieval and processing system for processing objects that includes a plurality of bins including objects to be distributed by the storage, retrieval and processing system, the plurality of bins being provided on an input conveyance system, a programmable motion device that includes an end effector for grasping and moving any of the objects, the programmable motion device being capable of reaching any of the objects within at least one of the plurality of bins in an input area of the input conveyance system, a routing conveyance system including a conveyor for receiving the selected object, and for moving the selected object from the input area in each of horizontal and vertical directions toward a destination container, and a destination container removal system for removing completed destination containers along a destination conveyance system, the destination conveyance system including a plurality of vertically stacked destination conveyors in communication with at least one helical conveyor for moving completed destination containers toward an output station In accordance with a further aspect, the invention provides a method of providing storage, retrieval and processing of objects including providing on a conveyance system a plurality of bins including objects to be distributed by the storage, retrieval and processing system, grasping and moving objects within at least one of the plurality of bins in an input area of the conveyance system using a programmable motion device that includes an end effector for grasping and moving any of the objects, providing perception data regarding a selected object that is presented to the perception system by the programmable motion device, routing the selected object in each of horizontal and vertical directions toward a destination container responsive to the perception data, said destination container being provided as one of a plurality of destination containers provided as a row on a destination conveyance system, and removing the row of destination containers as a set.

BRIEF DESCRIPTION OF THE DRAWINGS

The following description may be further understood with reference to the accompanying drawings in which.

Figure 1:
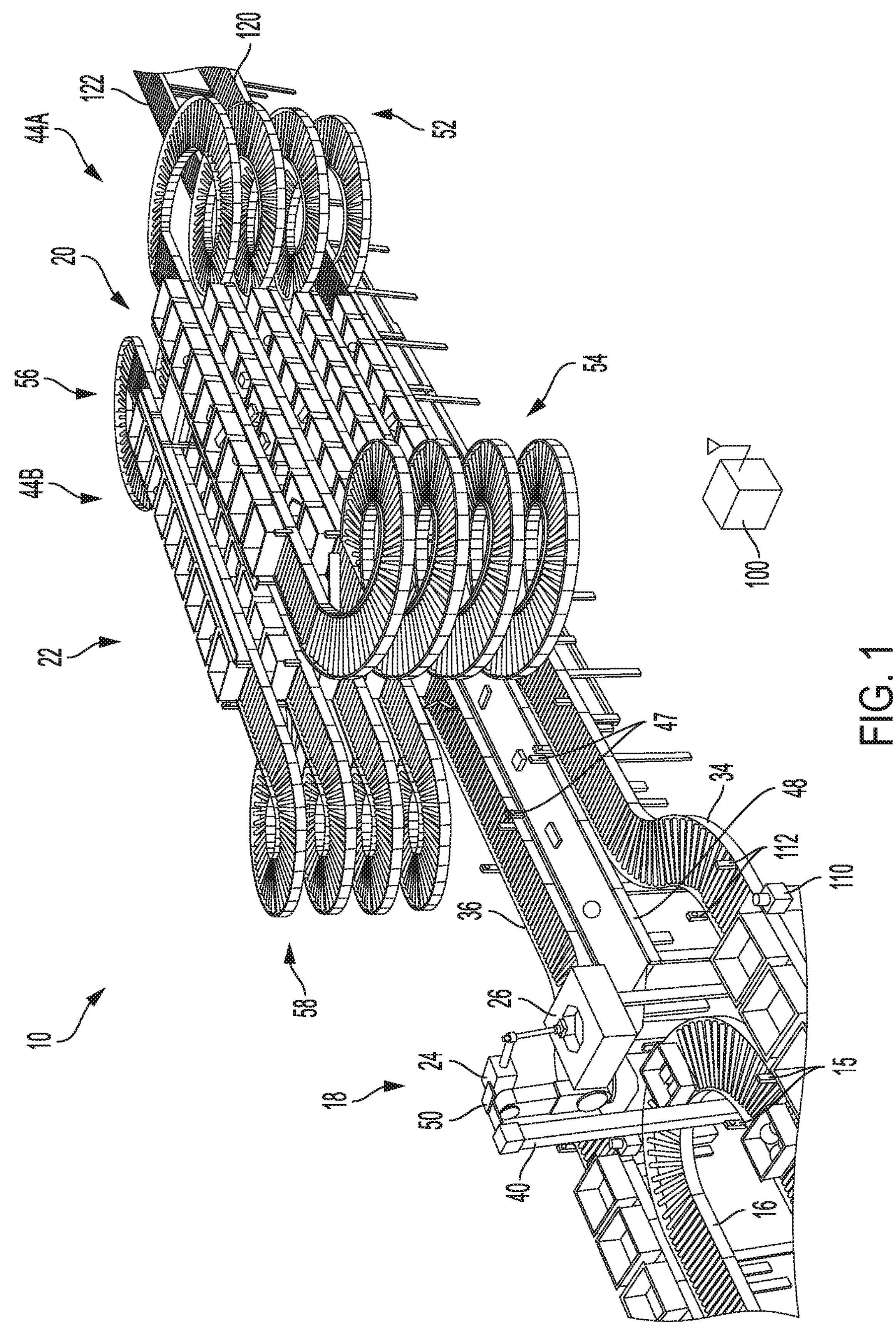
FIG. 1 shows an illustrative diagrammatic front isometric view of a storage, retrieval and processing system in accordance with an aspect of the present invention.

The drawings are shown for illustrative purposes only.

DETAILED DESCRIPTION

In accordance with an aspect, the invention provides an ASRS system 10 in which objects are provided in a plurality of bins 12 at an input area 14 of an input conveyance system 16. Objects are processed at a processing station 18, then routed via a routing conveyance system 20 to any of a plurality of destination containers at a destination area 22. The processing station 18 may include a programmable motion device 24, a bin perception unit 50 and an object perception unit 26.

Figure 2:
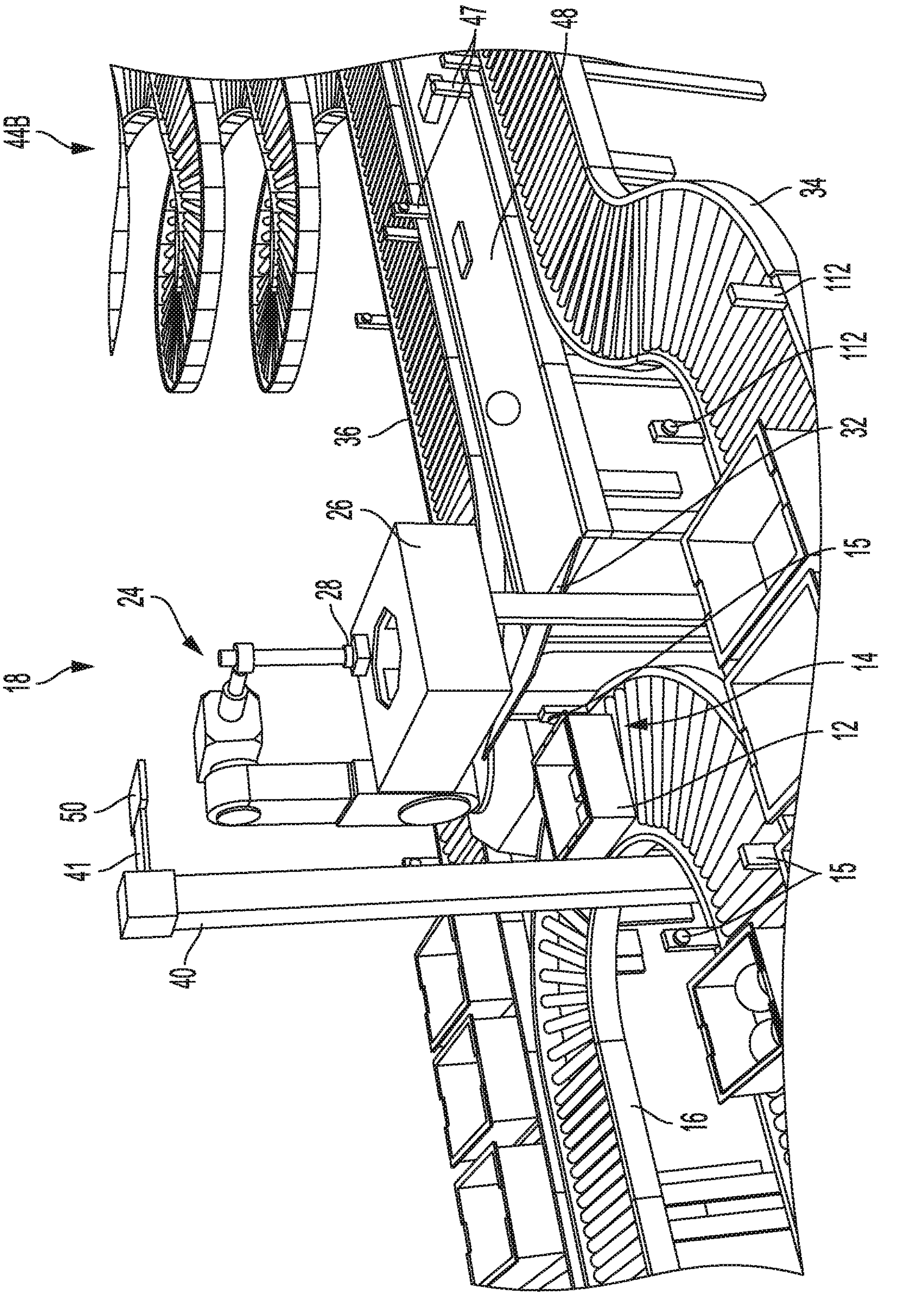
FIG. 2 shows an illustrative diagrammatic enlarged view of an intake portion of the system of FIG. 1.

Generally, objects are provided to the input area 14 in bins 12, are moved by a programmable motion device 24 to an object scanner 26, fall to an object conveyance system 48, and are routed to any of a plurality of destination containers in one or the other of a plurality vertically-coupled stacked rows of containers 44A, 44B. Empty containers are provided to each vertically-coupled stacked rows 44A, 44B, and completed containers are removed from each vertically-coupled stacked rows, by a container movement system adjacent either of output conveyors 34, 36. Each set of stacked rows may be vertically-coupled by an unloading helical conveyor 52, 56, as well as a loading helical conveyor 54, 58. With reference to FIG. 2, the input conveyor 16 may include a plurality of detectors 15 that monitor movement of the conveyors, and may confirm the identity and position of a conveyor at the input area 14 for processing at the processing station 18.

The operations of the system are coordinated with a central control system 100 as shown in FIG. 1 that communicates wirelessly with each of the conveyors and conveyor sensors, the programmable motion device 24, the perception units 50, 26, as well as all elements of the routing conveyance system, container arrays, container movement systems, and output conveyance systems (all components and systems). The perception unit 50 aids in grasping objects from the bins 12 with an end effector of the programmable motion device. Once grasped by the programmable motion device, the object is dropped into the drop perception unit 26, and the system thereby determines from symbol strings the UPC associated with the object, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 3:
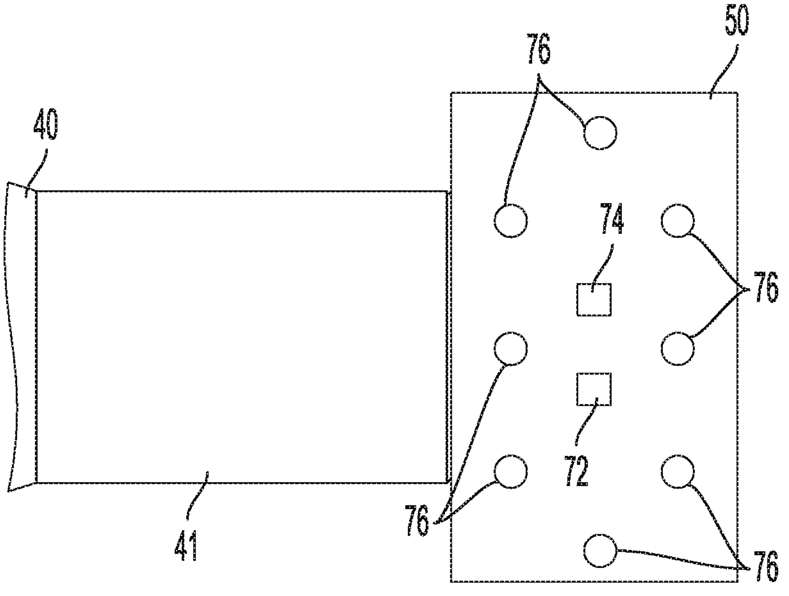
FIG. 3 shows an illustrative diagrammatic underside view of the bin perception unit of FIGS. 1 and 2.

In particular, the system of an aspect includes a perception system 50 that is mounted above a bin of objects to be processed next to the articulated arm 24, looking down into a bin 12. The system 50, for example and as shown in FIG. 3, may be attached via a mount 41 to a perception unit stand 40, and may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 4:
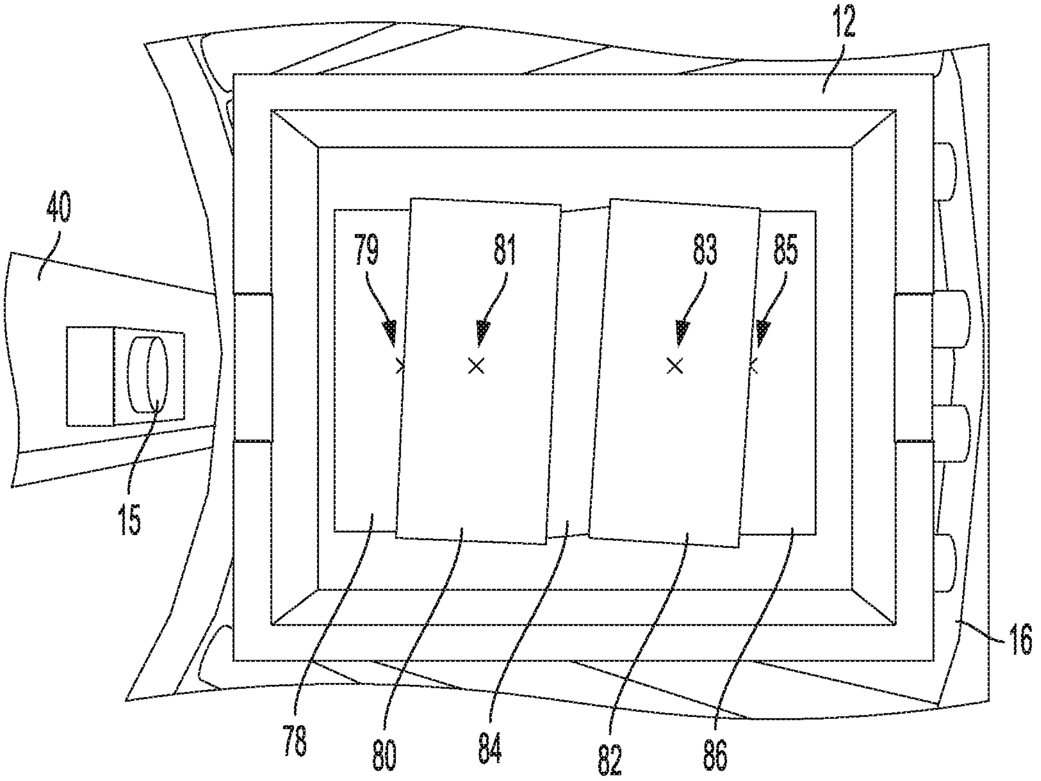
FIG. 4 shows an illustrative diagrammatic view from the bin perception unit of FIG. 3 directed to a bin and its contents.

FIG. 4 shows an image view from the perception unit 50. The image view shows a bin 12 in the input area 14 (a conveyor), and the bin 12 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp locations 79, 85 do not because each associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams, etc. where a good vacuum seal might not be available.

Figure 5:
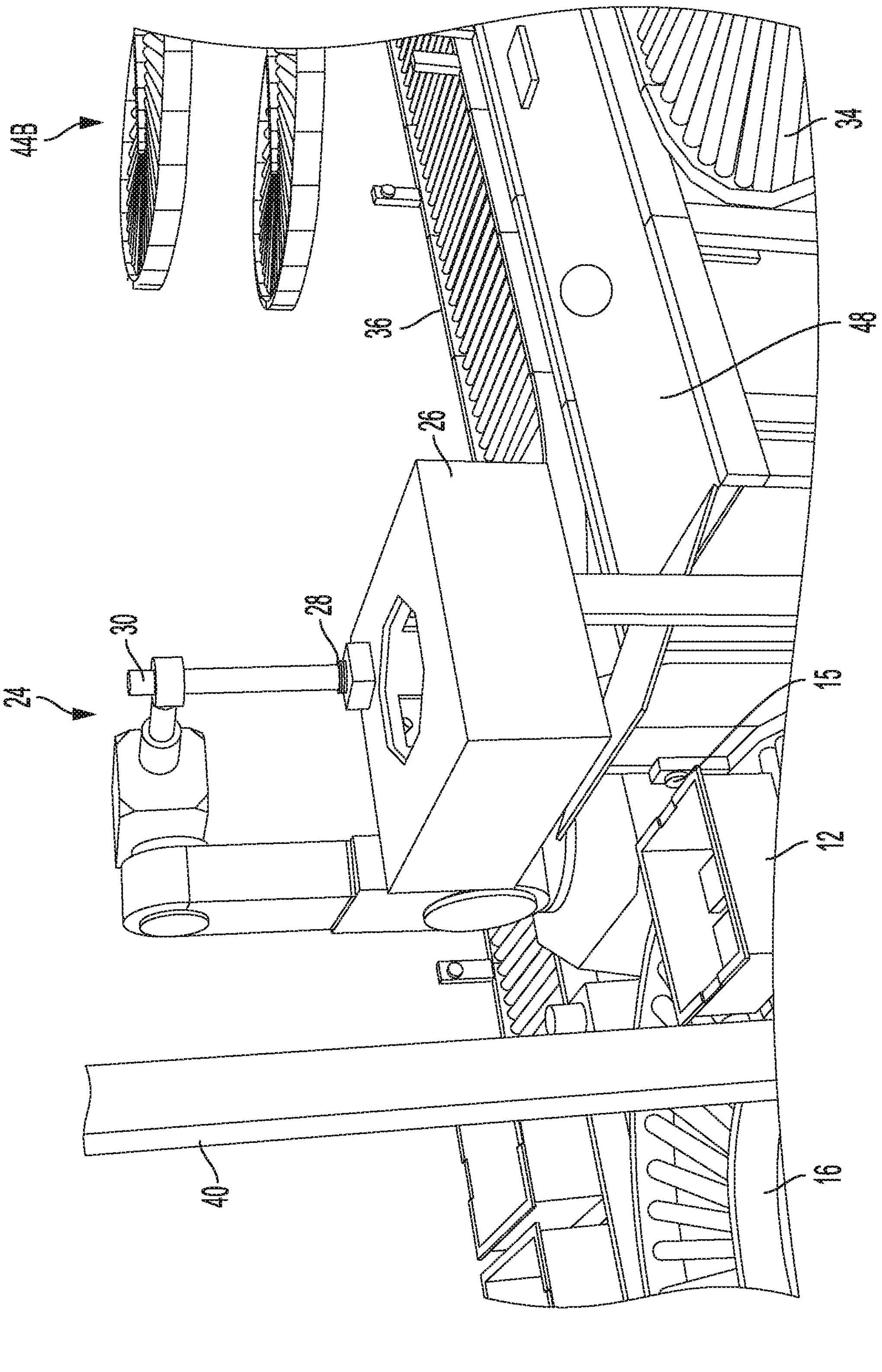
FIG. 5 shows an illustrative diagrammatic enlarged view of the object perception unit of the system of FIG. 1.
Figure 6:
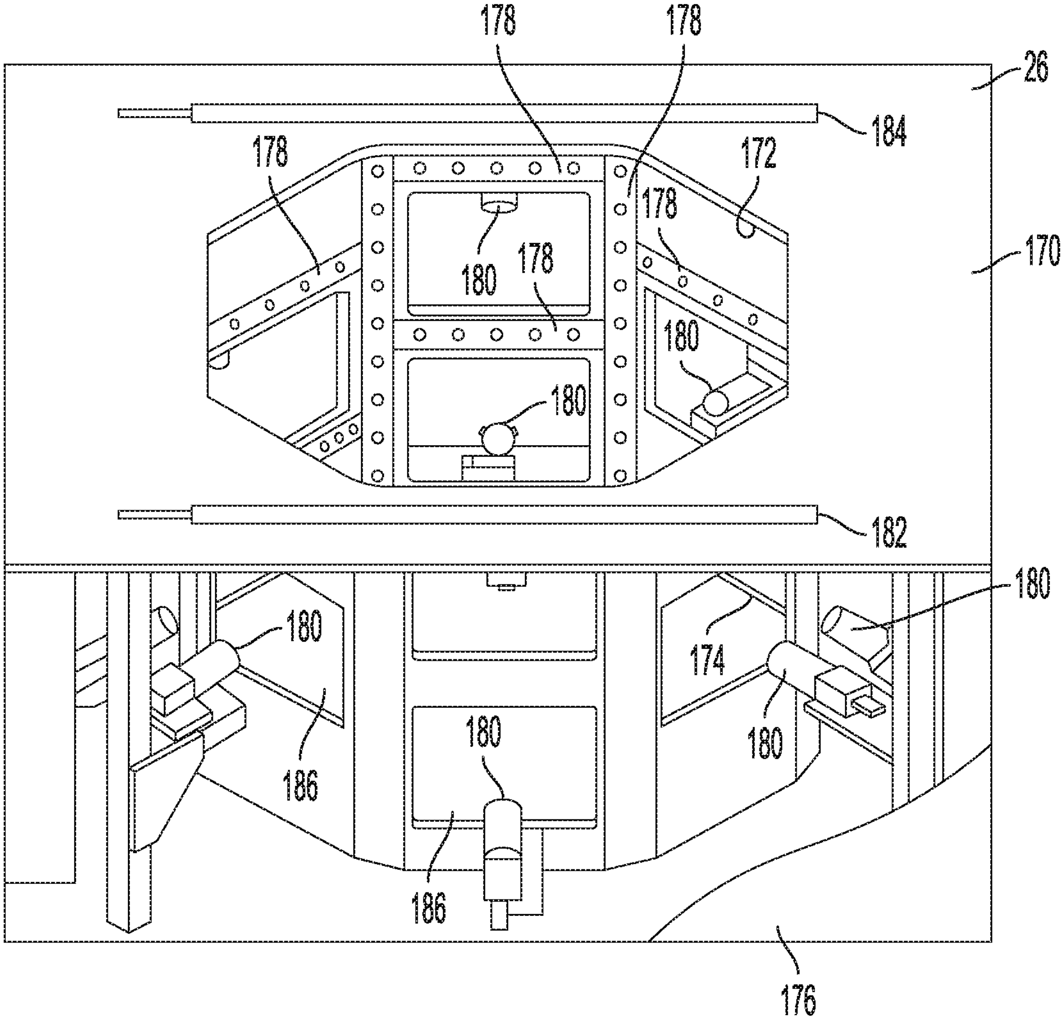
FIG. 6 shows an illustrative diagrammatic front elevated view of the object perception unit of FIGS. 1 and 5.
Figure 7:
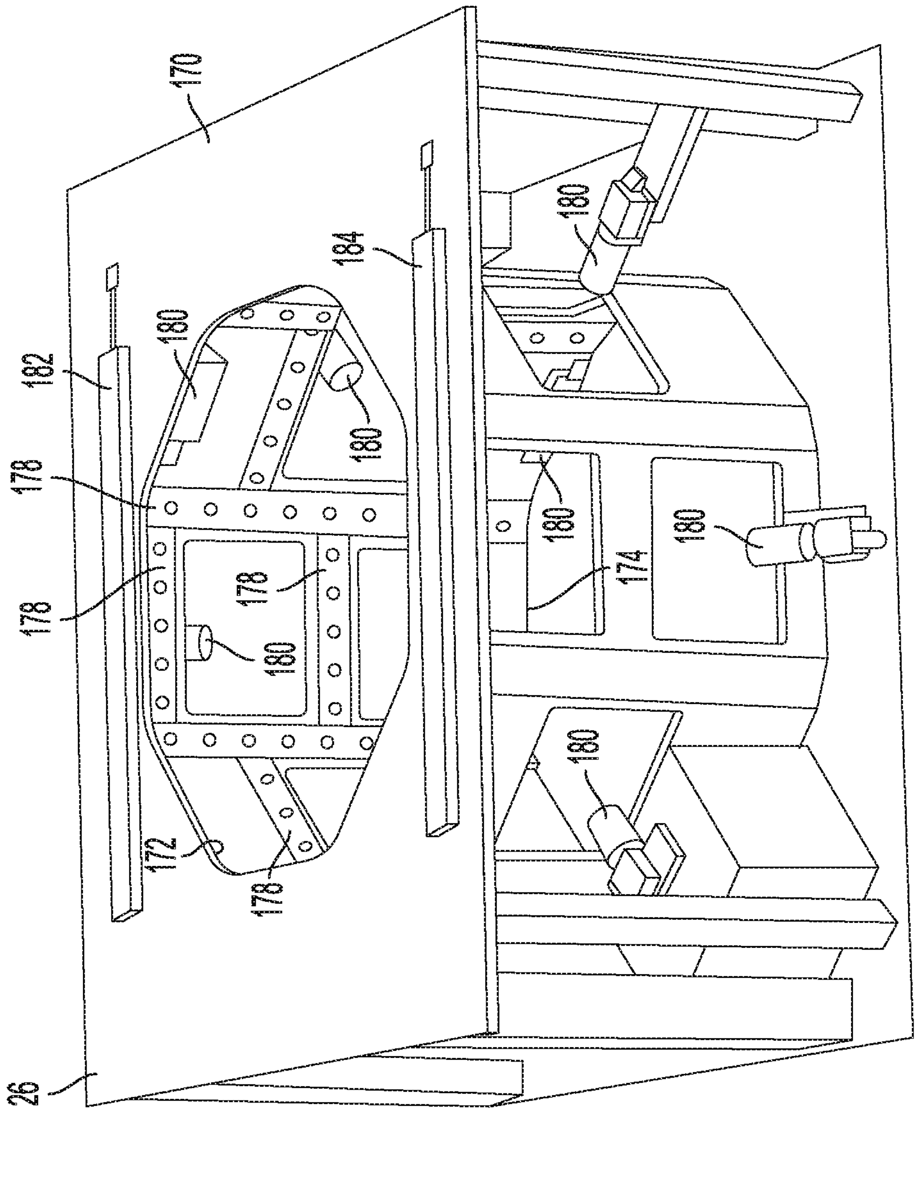
FIG. 7 shows an illustrative diagrammatic rear elevated view of the object perception unit of FIGS. 1 and 5.

With reference to FIG. 5, the programmable motion device 24 includes an end effector 28 that is coupled via a hose mount 30 to a vacuum hose attached to a vacuum source. With further reference to FIGS. 6 and 7, the perception unit 26 includes a structure 170 having a top opening 172 and a bottom opening 174, and the walls may be covered by an enclosing material 176 (e.g., a colored covering such as orange plastic, to protect humans from potentially dangerously bright lights within the perception unit 36) as shown in FIGS. 5 and 6. The structure 170 includes a plurality of rows of sources (e.g., illumination sources such as LEDs) 178 as well as a plurality of image perception units (e.g., cameras) 180. The sources 178 are provided in rows, and each is directed toward the center of the opening. The perception units 180 are also generally directed toward the opening, although some cameras are directed horizontally, while others are directed upward, and some are directed downward. The system also includes an entry source (e.g., infrared source) 182 as well as an entry detector (e.g., infrared detector) 184 for detecting when an object has entered the perception unit 36. The LEDs and cameras therefore encircle the inside of the structure 170, and the cameras are positioned to view the interior via windows that may include a glass or plastic covering (e.g., 186).

An important aspect of systems of certain embodiments of the present invention, is the ability to identify via barcode or other visual markings of objects, unique indicia associated with the object by employing a perception system into which objects may be dropped. Automated scanning systems would be unable to see barcodes on objects that are presented in a way that their barcodes are not exposed or visible. The perception system may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with unique indicia such as a unique code (e.g., barcode) or a unique destination (e.g., address) of the object.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor. With reference to FIG. 7, after an object has been dropped through the perception unit 26, it is guided by a guide chute 32 onto the routing conveyance system 20.

The manner in which outbound objects are organized is such that objects are placed in a bin, shelf location or container, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from unique identifying indicia (identify or destination, such as a bar code or a unique address), which identifies the object or its destination.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with unique identifying indicia (identity or destination).

The operations of the systems described herein are coordinated by the central control system 100 as shown in FIG. 1. This system determines from symbol strings the unique indicia associated with an object, as well as the outbound destination for the object. The central control system is comprised of one or more workstations or central processing units (CPUs). The correspondence between unique identifying indicia and outbound destinations is maintained by the central control system in a database called a manifest. The central control system maintains the manifest by communicating with a warehouse management system (WMS).

With reference to FIGS. 8A-8D, the routing conveyance system receives objects (e.g., a singulated stream of objects) from the object feed conveyor 48. The routing conveyance system includes one or more routing conveyor units 38A, 38B, each of which includes an object conveyor 37 mounted on a frame 39. Each frame 39 is movably coupled to a vertical rail system 43, the upper and lower ends of each of which are movably coupled to a horizontal rail system 45 (also shown in FIG. 1). In accordance with various aspects, the rail systems may be reversed, providing horizontal rail systems mounted to vertical rail systems.

Each routing conveyor unit 38A, 38B is adapted to receive a selected object on its object conveyor 37, which is mounted on the frame 39 that travels along the track system 43, 45 in both vertical and horizontal directions between the at least two vertically-coupled stacked rows 44A, 44B of destination containers 46 (e.g., bins, totes, boxes, etc.). The selected object (e.g., 41) is received by the object conveyor 37 from the object feed conveyor 48 of the conveyance system, and brings the object toward a selected destination container among the vertically-coupled stacked rows 44A, 44B. After routing the selected object to the selected destination location, the routing conveyor is returned to the object feed conveyor 48 to receive a new object. Routing conveyor units 38A, 38B are programmed to avoid each other, for example, by generally moving at different elevations when passing one another.

Figure 8A:
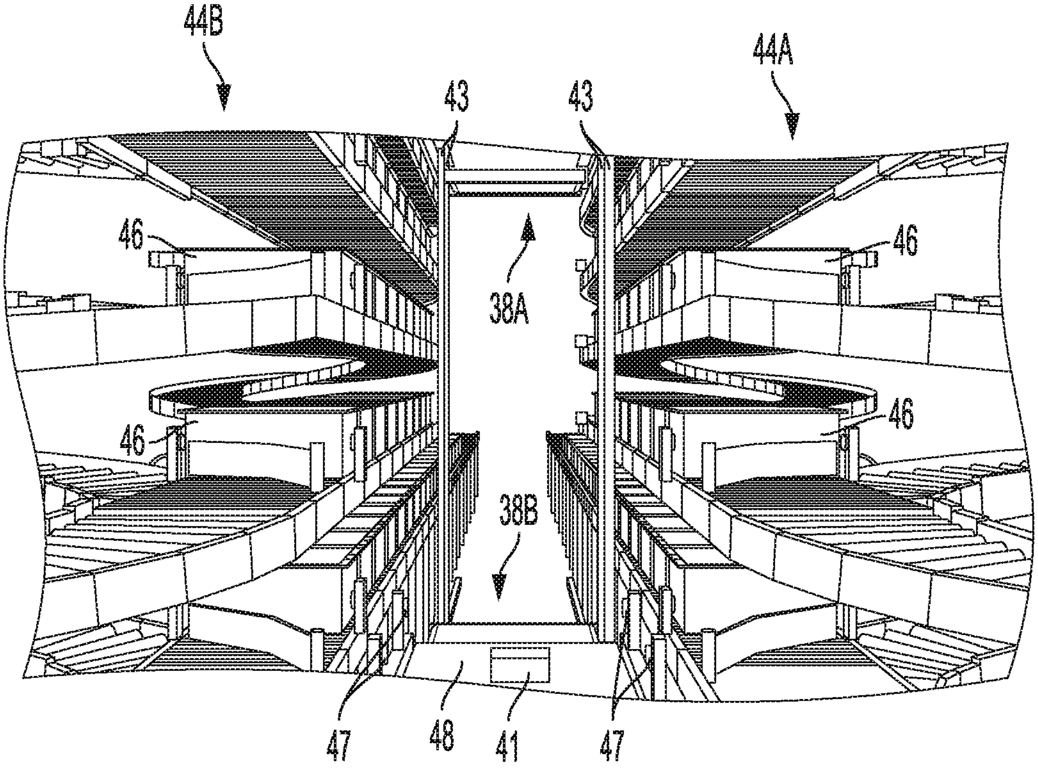
FIGS. 8A-8D show illustrative diagrammatic views of an object being moved in the object routing conveyance system of FIG. 1.
Figure 8B:
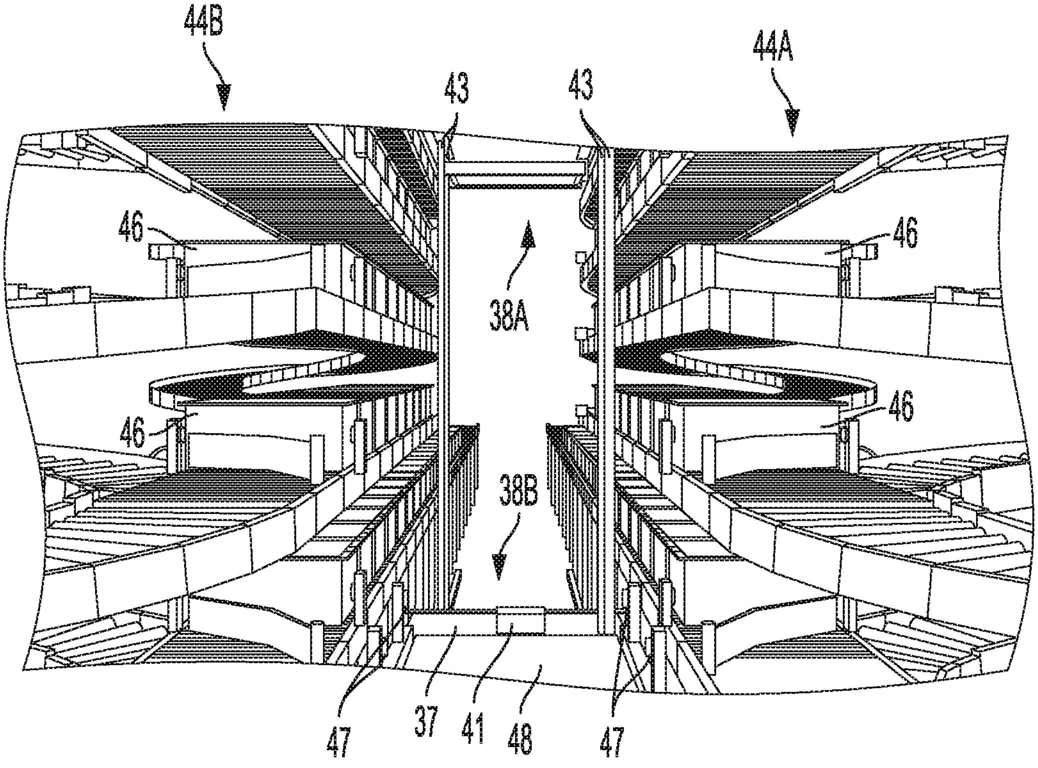
Figure 8C:
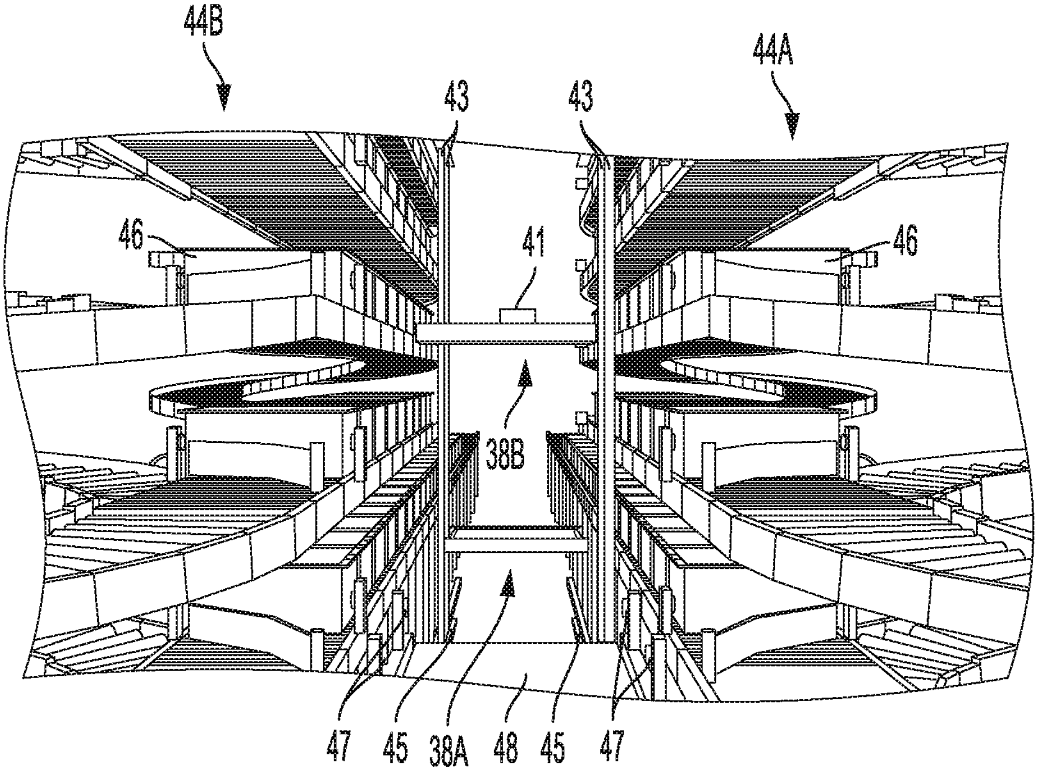
Figure 8D:
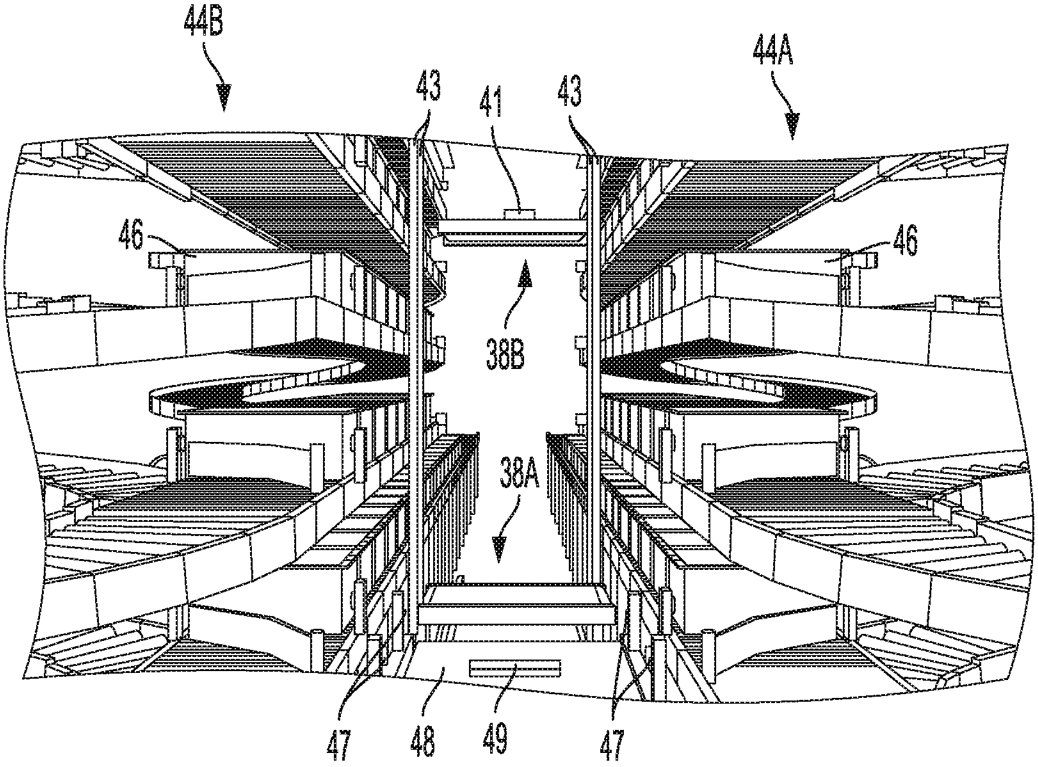

In particular, with reference to FIG. 8A, while routing conveyor unit 38B approaches the object feed conveyor 48 from an elevation below the object feed conveyor 48, routing conveyor unit 38B may be destined for or located at a container at relatively high elevation. Once the routing conveyor unit 38B receives the object 41 (as shown in FIG. 8B), the system will begin to move the object toward its destination container (e.g., as assigned by a WMS system). If the destination container is located at a higher elevation, the routing conveyor unit 38B will begin to rise and move away from the object feed conveyor 48, while also moving the routing conveyor unit 38A downward and toward the object feed conveyor 48 (as shown in FIG. 8C). When the routing conveyor unit 38B reaches the selected destination container, the routing conveyor unit 38A approaches the object feed conveyor from below (as shown in FIG. 8D). If the assigned destination container is relatively low in one or the other of the vertically-coupled stacked rows 44A, 44B, the returning routing conveyor unit will travel a relatively high path back to the object feed conveyor. Each routing conveyor unit 38A, 38B is coupled via vertical and horizontal rails to one of the two vertically stacked arrays of rows, but they avoid colliding by having the returning unit follow a vertically opposite path than a path to be taken by the other routing conveyor unit in bringing a new object to a selected destination bin. Each routing conveyor unit 38A, 38B may move an object into a destination bin located in either vertically-coupled stacked rows 44A, 44B (to either side of the routing conveyor unit 38A, 38B).

Figure 9A:
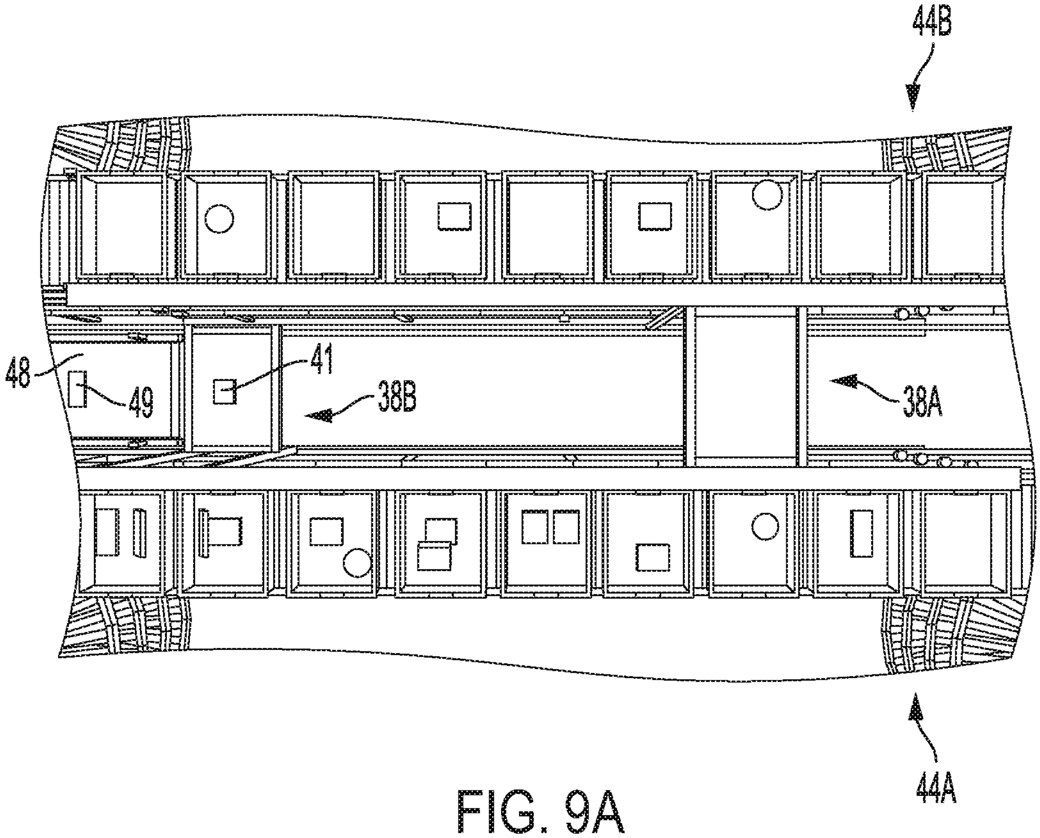
FIGS. 9A-9C show illustrative diagrammatic views of movement of object conveyors in the object routing conveyance system of FIG. 1.
Figure 9B:
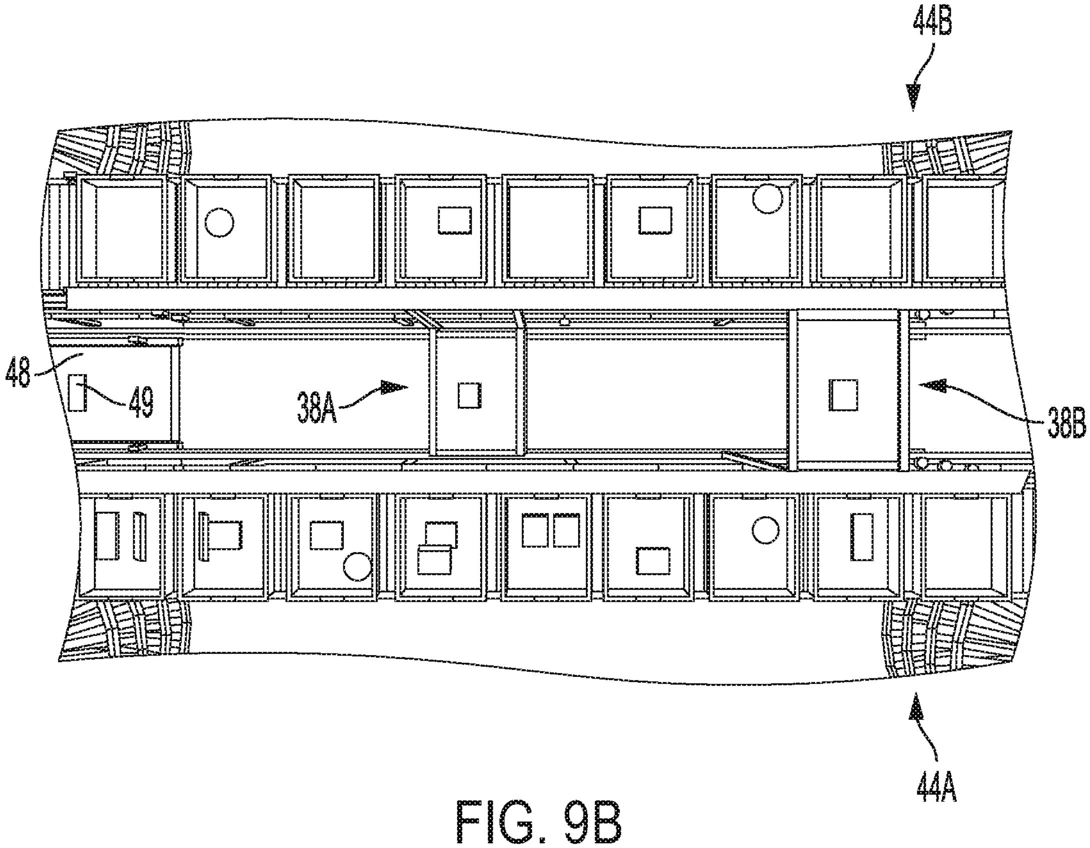
Figure 9C:
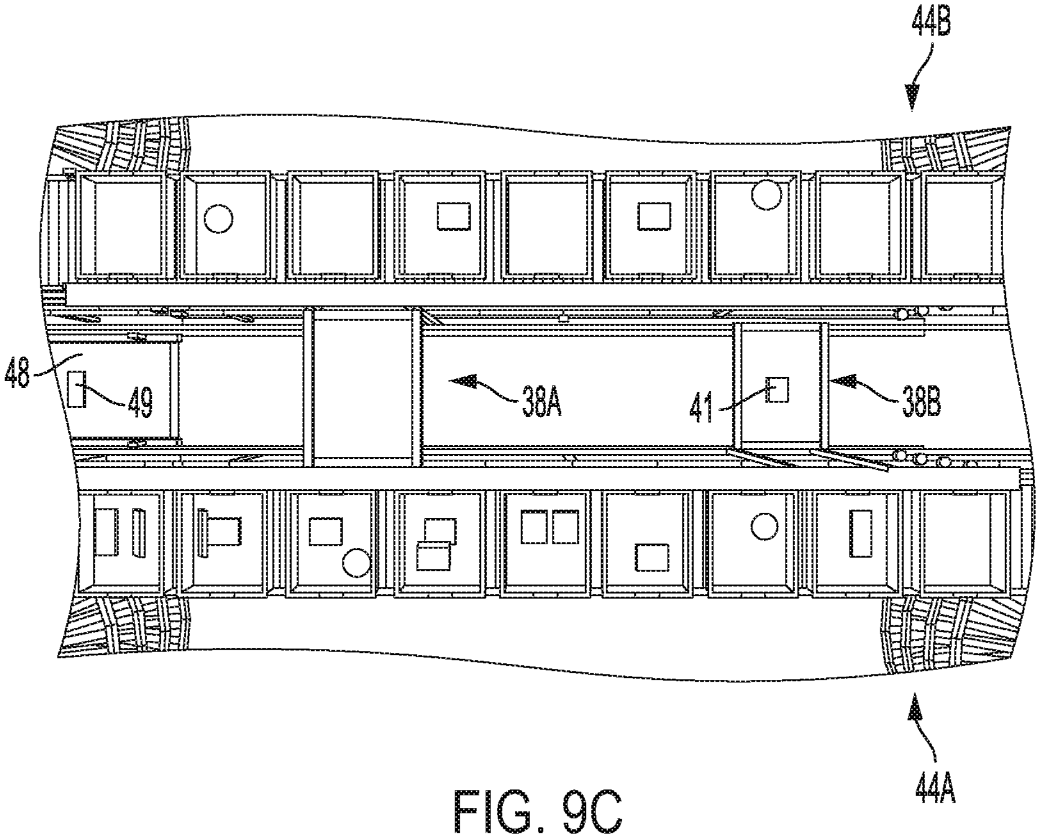

With reference to FIG. 9A, when a newly loaded routing conveyor unit (e.g., 38B) carrying an object 41 is assigned a selected destination container, the system determines whether the selected destination container is located at an upper elevation or a lower elevation (all locations are assigned to be one or the other). If the destination location is located at an upper elevation, the returning routing conveyor unit 38A moves at a lower elevation back to the object feed conveyor 48 (as shown in FIG. 9B). If, on the other hand, the destination location is located at a lower elevation, the returning routing conveyor unit 38A moves at an upper elevation back to the object feed conveyor 48 (as shown in FIG. 9C).

The system therefore provides objects to either of two adjacent vertically stacked rows of destination containers, wherein at least two routing conveyor units are used to move objects from a loading location (at conveyor 48) to any destination container in either of the vertically coupled stacked rows 44. The routing conveyor units are moved such that one returns to the loading location while the other is delivering an object, and the returning unit moves vertically opposite the delivering unit. For example, if the delivering unit is moving to a location in the upper half of either of the vertically coupled stacked rows 44, then the returning unit is moved in the lower half of the area between the vertically coupled stacked rows. Conversely if the delivering unit is moving to a location in the lower half of either of the vertically coupled stacked rows 44, then the returning unit is moved in the upper half of the area between the vertically coupled stacked rows. In this way, the routing conveyor units 38A, 38B avoid colliding. Each of the objects is therefore moved vertically and horizontally by a routing conveyor unit, and then moved in a third direction by the container conveyor wherein the third direction is generally orthogonal to the first and second directions. The container may later be removed from the open storage location also along the third direction when completed as discussed in more detail below.

Figure 10A:
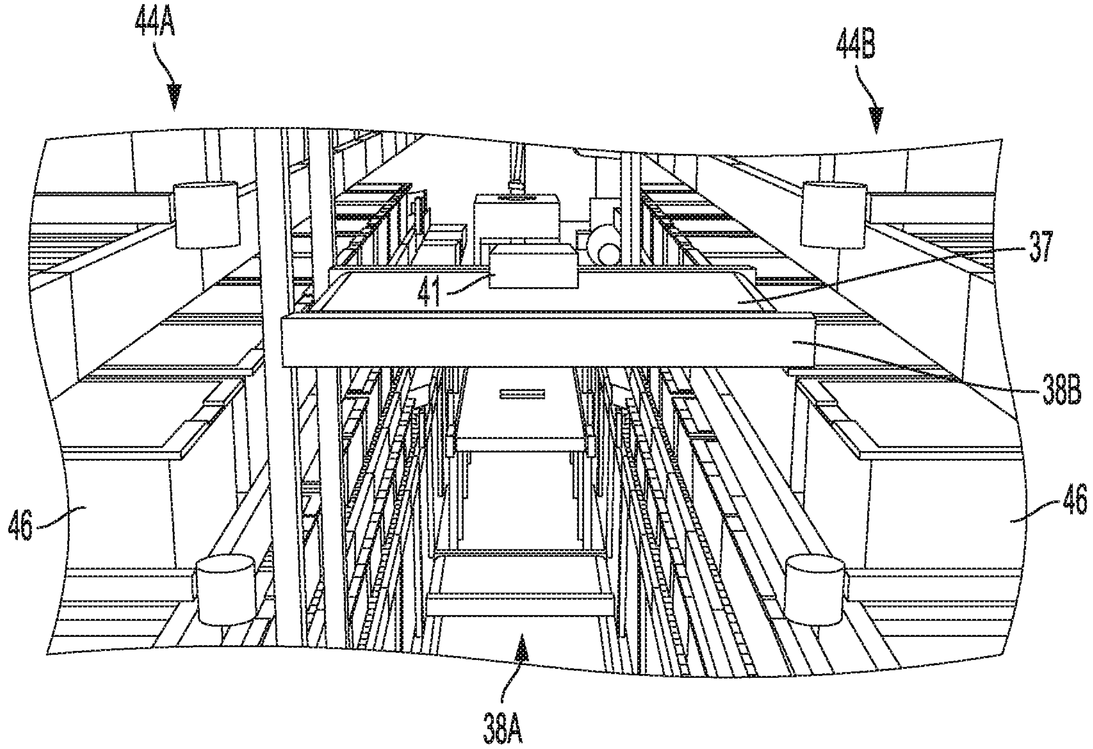
FIGS. 10A-10C show illustrative diagrammatic views of an object being moved to a destination container in the system of FIG. 1.
Figure 10B:
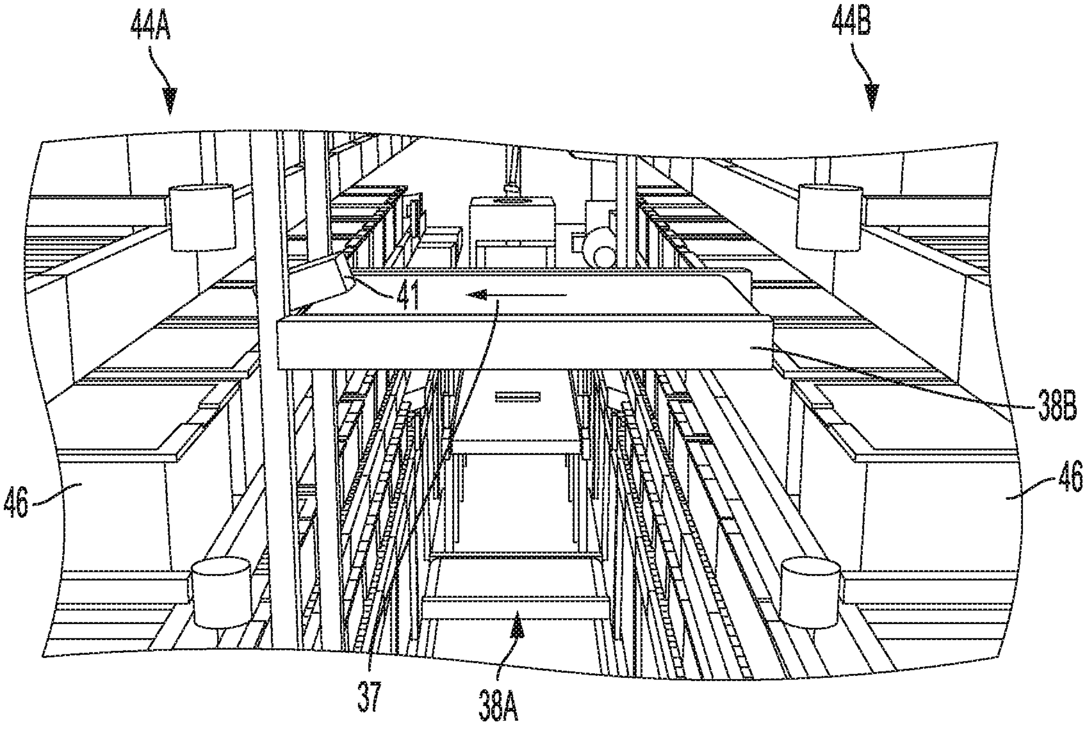
Figure 10C:
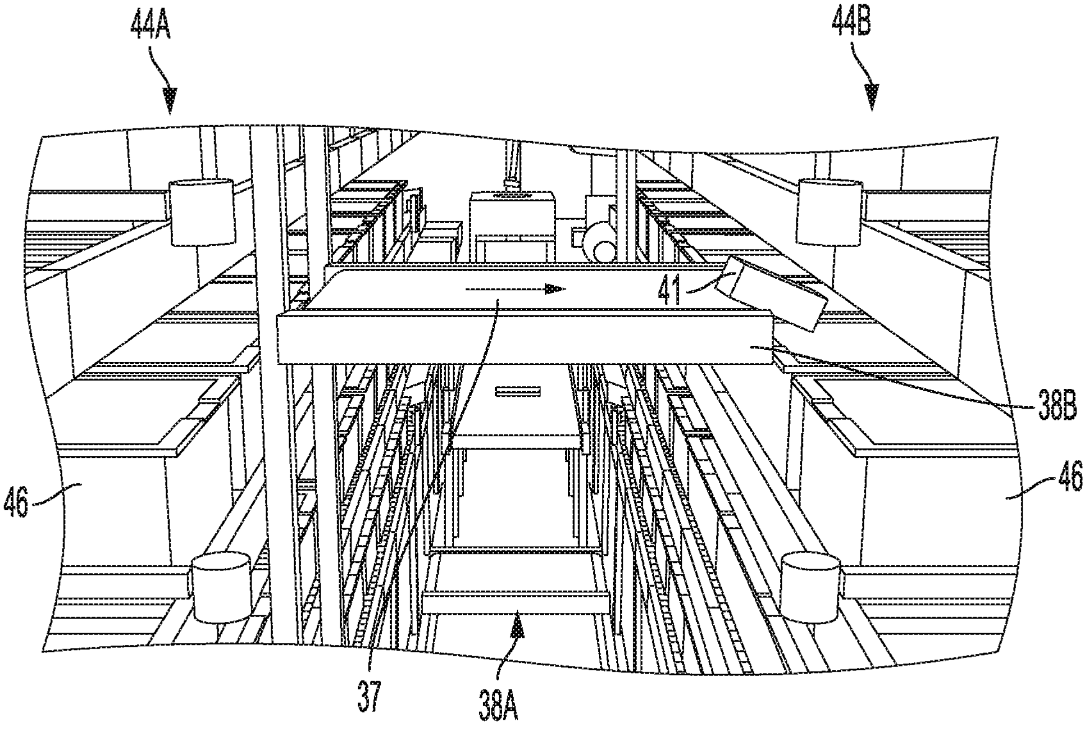

FIG. 10A shows the routing conveyor unit 38B at a destination position with a selected object 41 on its object conveyor 37. If the selected destination container is within the vertically-coupled stacked row 44B, the conveyor 37 moves to urge the object into the destination container therein (as shown in FIG. 10B), and if the selected destination container is within the vertically-coupled stacked rows 44A, the conveyor 37 moves to urge the object into the destination container therein (as shown in FIG. 10C). Each routing conveyor unit 38A, 38B may thereby provide an object thereon to any destination container within either vertically-coupled stacked rows 44A, 44B. Destination containers 46 in the vertically-coupled stacked rows 44A, 44B of destination containers are thereby populated with objects from the input bins 12 via the processing station 18 and the routing conveyance system at a destination area 22.

Figure 11:
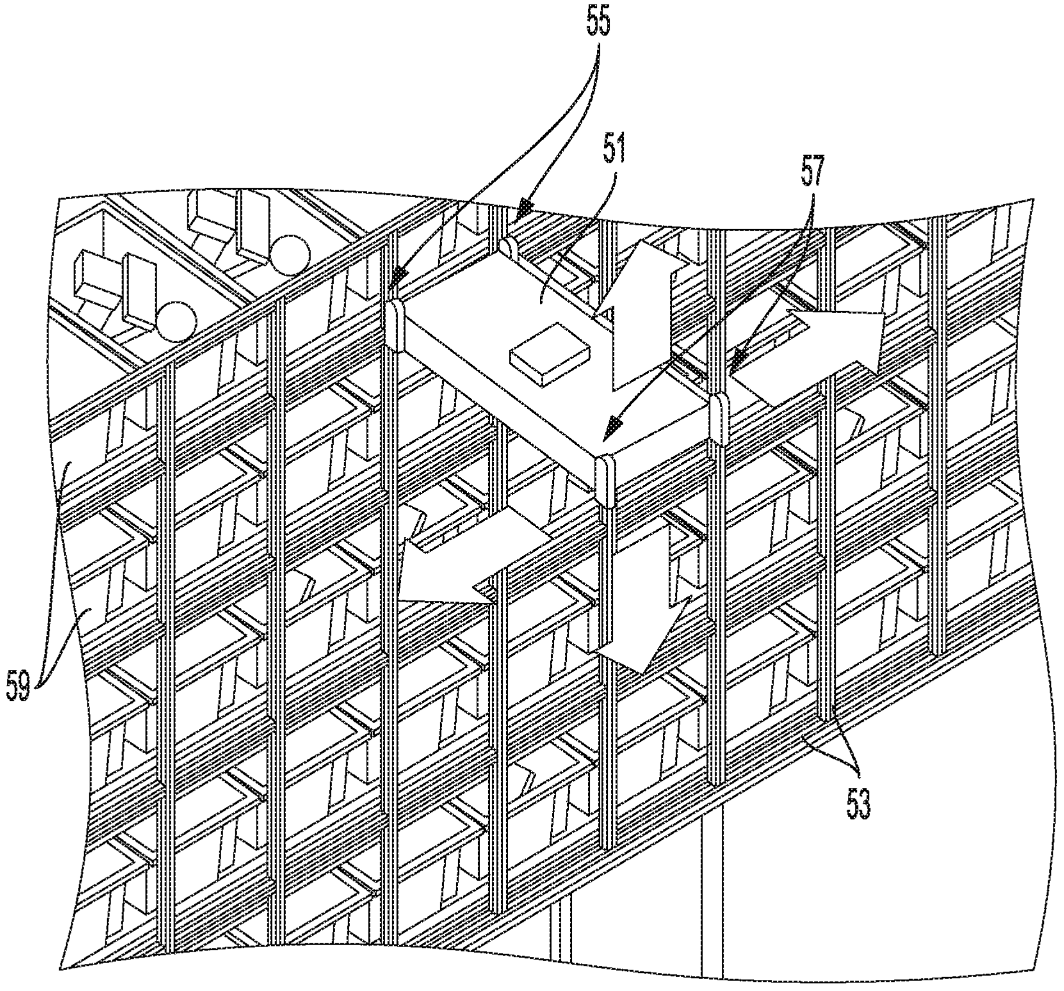
FIG. 11 shows an illustrative diagrammatic view of a routing conveyance system in accordance with a further aspect of the present invention that includes mutually orthogonally disposed sets of rollers.

In accordance with a further aspect of the invention, the routing conveyance system includes one or more routing conveyor unit(s) 51 including mutually orthogonally disposed sets of rollers that engage a grid track system 53, permitting the routing conveyor unit(s) 51 to access destination containers 59 as shown in FIG. 11. Additionally, the unit(s) 51 may further include an additional set of mutually orthogonally disposed sets of rollers 57 for engaging a grid track system on the opposing side, such that each unit 51 may be supported by inside walls of both sets of vertically-coupled stacked rows 44A, 44B of destination containers. Each of the horizontal rollers may be engaged separately from and alternate to the vertical rollers to permit the unit 51 to move about the routing conveyance system 20. Again, where more than one unit 51 is employed, the system may similarly provide avoidance routines to prevent the units from colliding. The movement of objects into destination containers at a first side of the destination containers, and having the completed destination containers removed as completed rows from an opposite second side, permits the object conveyance system to continue to operate while destination containers are being replenished. Further, the system may dynamically assign destination containers in a row such that each destination container in a row may have a similar expected frequency of container completeness factor or receive objects having a similar frequency of object arrival factor. For example, destination containers that are expected to be completed relatively quickly (those with a high expected frequency of container completeness factor or are assigned to receive objects having a high frequency of object arrival factor) may be assigned to spots on a common row, while those with a low expected frequency of container completeness factor or are assigned receive objects having a low frequency of object arrival factor, may be assigned spots on a different row. In this way, the efficiencies of removing one row of completed destination containers at a time may be well utilized. In accordance with further aspects, each row may include destination containers having other aspects in common, such as having all destination containers of a row be assigned to a common shipping destination.

Figure 12:
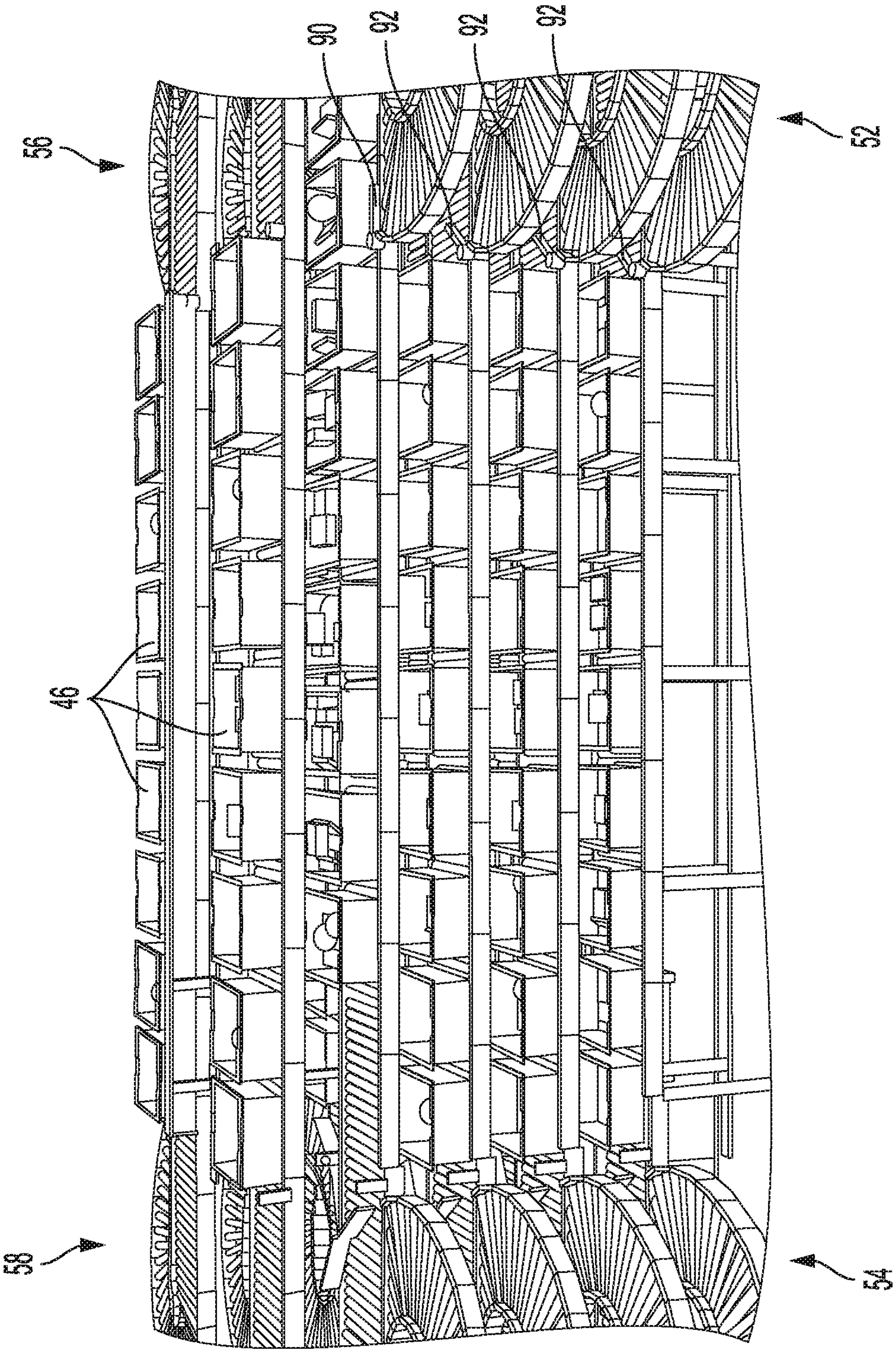
FIG. 12 shows an illustrative diagrammatic view of the system of FIG. 1 with a row of completed destination containers being removed.
Figure 13:
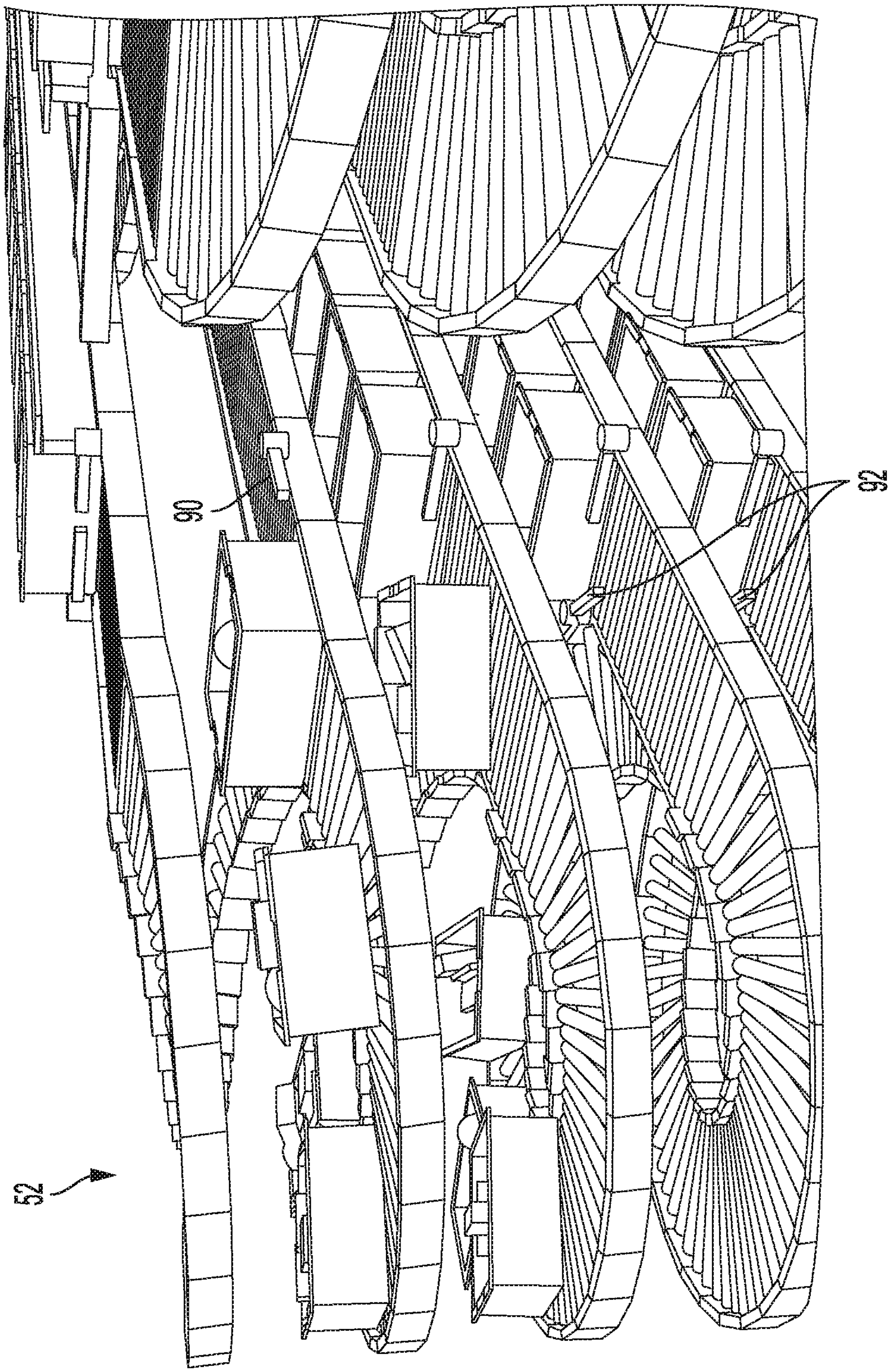
FIG. 13 shows an illustrative diagrammatic view of the system of FIG. 1 with the row of completed destination containers being further moved along an unloading helical conveyor.
Figure 14:
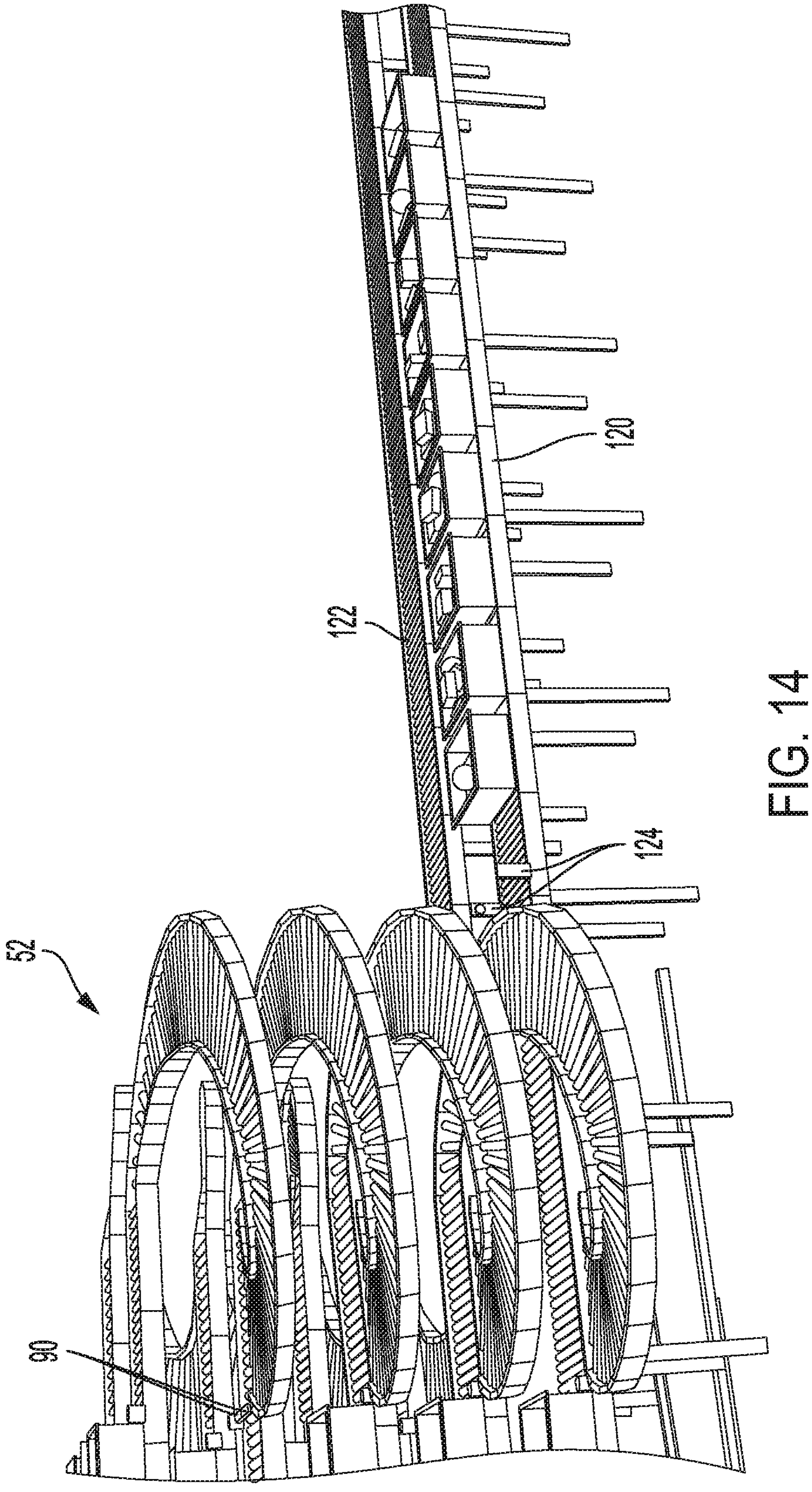
FIG. 14 shows an illustrative diagrammatic view of the system of FIG. 1 with the row of completed destination containers being provided to an output conveyor.

When each destination container in a row of destination containers is full or otherwise finished being processed, the system may discharge the row as follows. With reference to FIG. 12, the system opens end gates 90 on the selected row, and aligns (opens half-way) end gates 92 in the rows below the selected row. The aligned gates 92 are designed to facilitate the destination containers moving down the unload helical conveyor 52. FIG. 13 shows a back view of the gates 90, 92, and shows the completed containers from the row being moved downward along the helical conveyor 52. With further reference to FIG. 14, when the completed containers are all provided to the output conveyor 120, 122 (as determined, for example, by sensors 124), the gates 90 are closed to as to prepare the empty row to receive a new set of destination containers.

Figure 15:
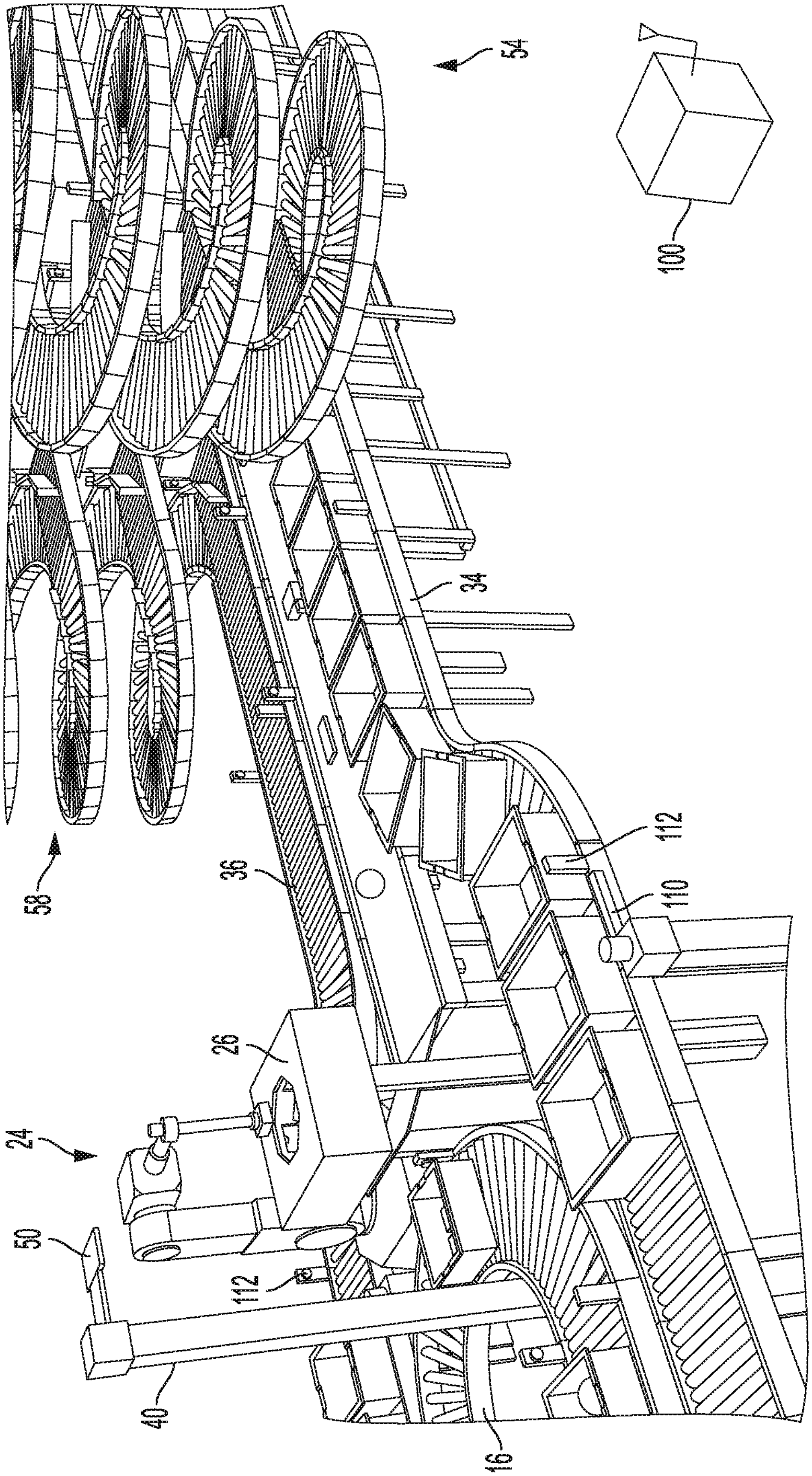
FIG. 15 shows an illustrative diagrammatic view of the system of FIG. 1 with a row of empty destination containers being moved toward a loading helical conveyor.
Figure 16:
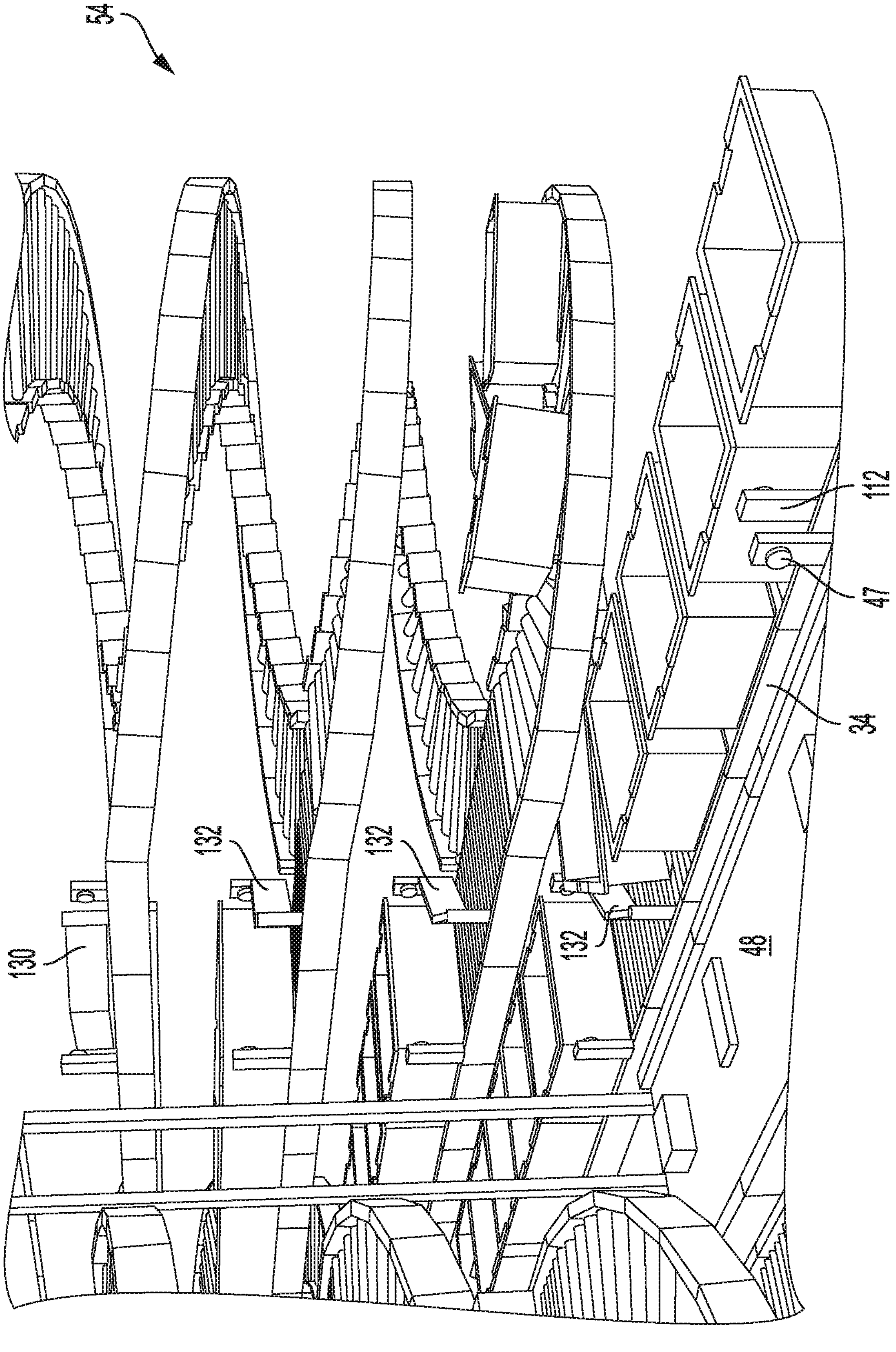
FIG. 16 shows an illustrative diagrammatic view of the system of FIG. 1 with the empty destination containers being moved upward along the loading helical conveyor.
Figure 17:
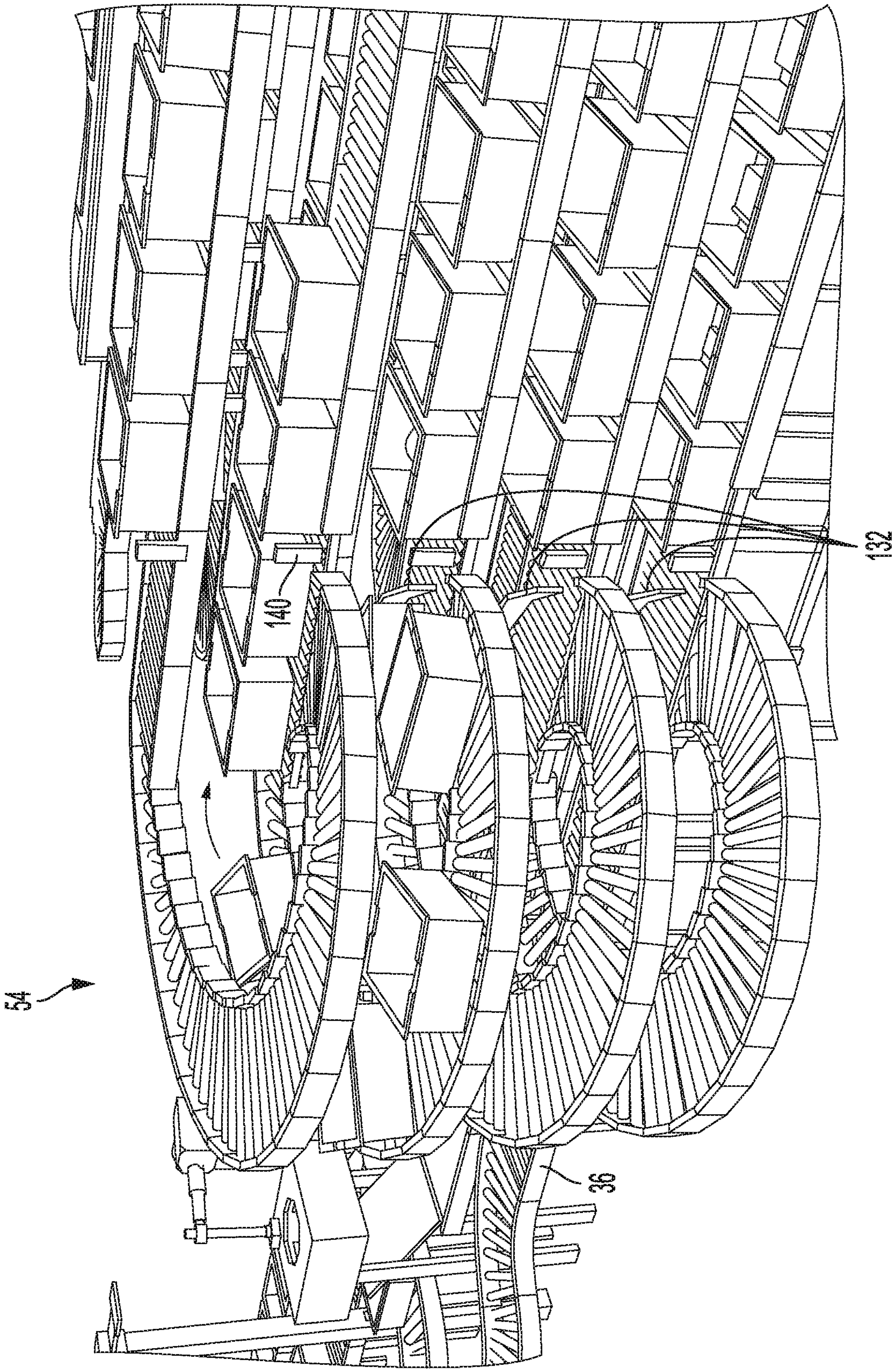
FIG. 17 shows an illustrative diagrammatic view of the system of FIG. 1 with the empty destination containers being moved off of the loading helical conveyor onto an empty row.
Figure 18:
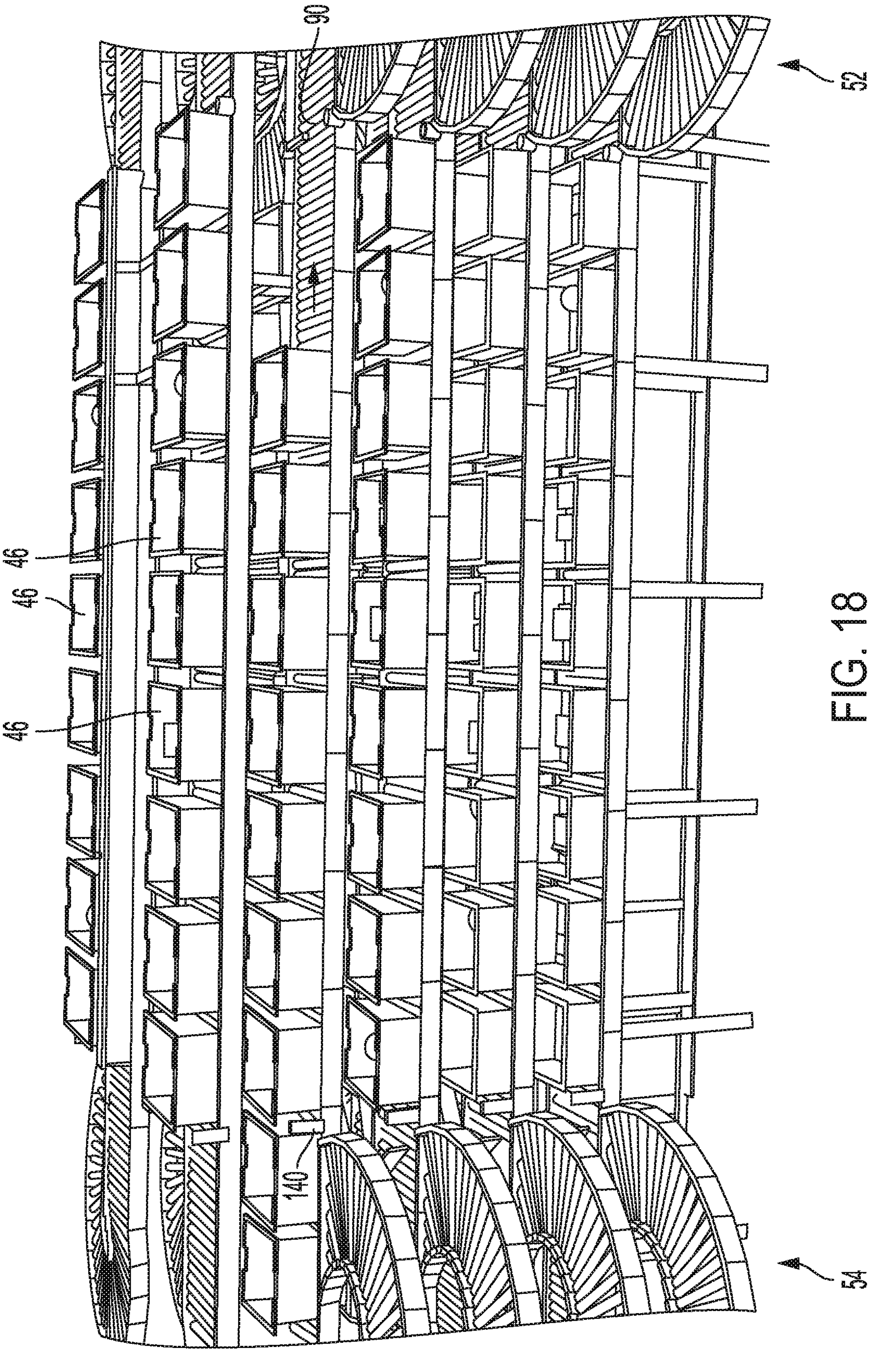
FIG. 18 shows an illustrative diagrammatic view of the system of FIG. 1 with the empty destination containers being moved onto the empty row.
Figure 19:
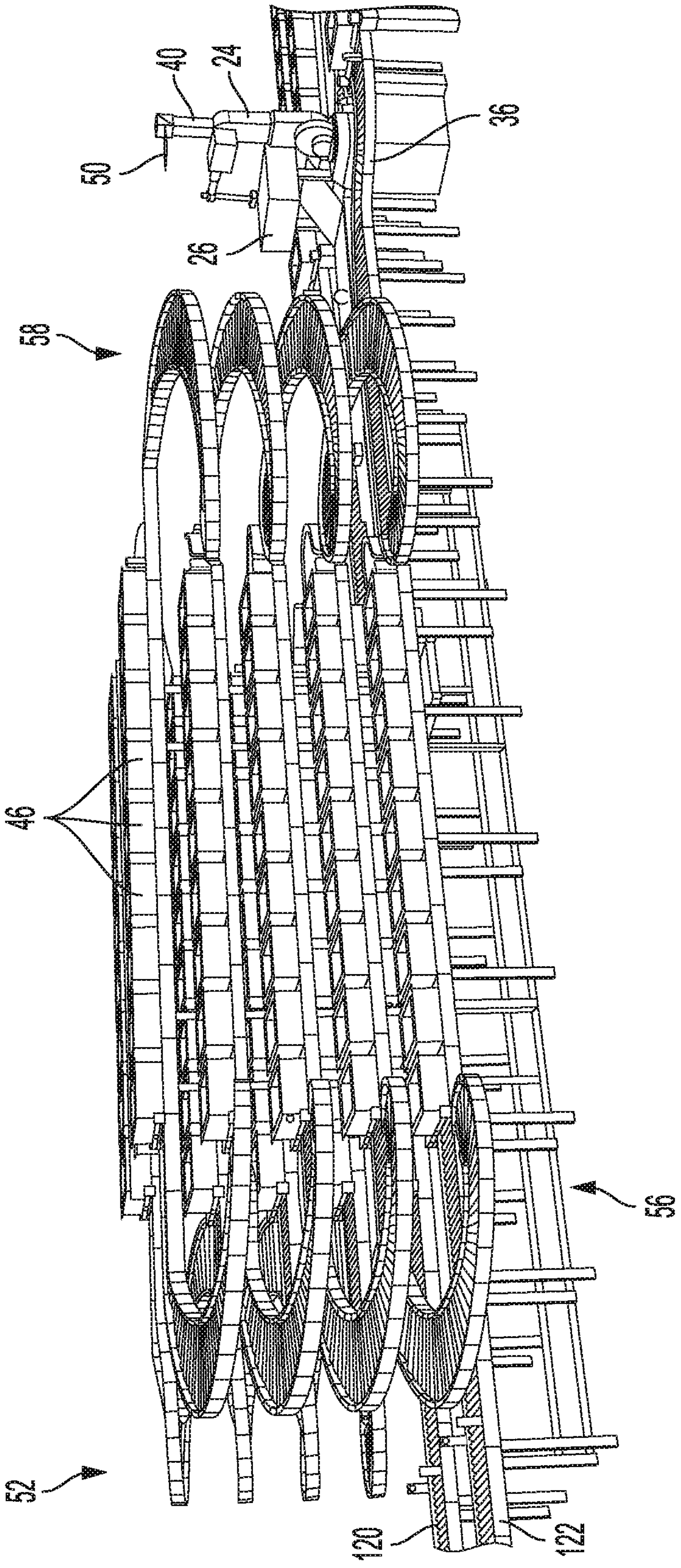
FIG. 19 shows an illustrative diagrammatic rear isometric view of the system of FIG. 1.

With reference to FIG. 15, a new set of empty destination containers is provided by first opening gates 110, and monitoring (e.g., by sensors 112) movement of empty containers along a container in-feed conveyor 34, 36 (e.g., 34 as shown) toward a load helical conveyor (e.g., 54 as shown). In-feed gate 130 is opened on the row to be loaded with the empty containers, and the remaining in-feed gates 132 remain closed as shown in FIG. 16. The empty containers are loaded onto the row (as shown in FIGS. 17 and 18), and registered as being complete with information from the sensors 140 as the containers come to rest against the closed end-stop gates 90. The rollers on the conveyor sections 34, 54 may be actively powered and coated with a friction providing surface such as urethane, polyurethane, vinyl, rubber, etc., and each conveyor 34, 54 may include a plurality of sensors for monitoring the location of each container on the conveyors 34, 54. Once loaded, the in-feed gate 130 associated with the row is closed. FIG. 19 shows a rear view of the system of FIG. 1 showing the un-load helical conveyor 56 and the load helical conveyor 58.

Those skilled in the art will appreciate that numerous variations and modifications may be made to the above disclosed embodiments without departing from the spirit and scope of the present invention.

What is claimed is:

1. An object processing system for processing objects, said object processing system comprising:

a plurality of objects that are provided at a processing station;

a programmable motion device that includes an end effector for grasping and moving any of the objects, said programmable motion device reaching any of the objects at an input area of the processing station;

a plurality of arrays of destination locations, each array of destination locations including horizontally extending destination locations and vertically extending destination locations, the plurality of arrays of destination locations being mutually parallel and spaced apart by a routing conveyance spacing;

a first routing conveyor unit that includes a first bidirectional conveyor thereon, the first routing conveyor unit being mounted on a first track system on a first side of the routing conveyance spacing, the first routing conveyor unit being adapted to receive a first object at the processing station and to move the first object into any destination location of the plurality of arrays of destination locations;

a second routing conveyor unit that includes a second bidirectional conveyor thereon, the second routing conveyor unit being mounted on a second track system on a second side of the routing conveyance spacing, the second routing conveyor unit being adapted to receive a second object at the processing station and to move the second object into any destination location of the plurality of arrays of destination locations; and a control system for providing that the first routing conveyor unit and the second routing conveyor unit avoid one another.

2. The object processing system of claim 1, wherein the processing station further includes a feed conveyance system with a discharge end at which each of the first and second routing conveyor units receive the first and second objects respectively.

3. The object processing system of claim 2, wherein the object processing system further includes a perception system at the processing station for providing perception data regarding each of the plurality of objects, and wherein first and second objects are routed to the first and second destination locations respectively responsive to the perception data.

4. The object processing system of claim 3, wherein the perception system includes a drop perception unit that is positioned above an input end of the feed conveyor system.

5. The object processing system of claim 1, wherein the plurality of arrays of destination locations each include an associated destination bin.

6. The object processing system of claim 5, wherein the destination bins of the plurality of destination locations are provided in two sets of stacked rows of conveyor systems.

7. The object processing system of claim 6, wherein the conveyor systems each include a source end at which empty destination bins are provided, and a discharge end at which the destination bins are discharged from the system.

8. The object processing system of claim 7, wherein the source end of at least some of the conveyor systems includes a helical conveyor.

9. The object processing system of claim 7, wherein the discharge end of at least some of the conveyor systems includes a helical conveyor.

10. An object processing system for processing objects, said object processing system comprising:

a plurality of objects that are provided at a processing station;

a perception system for providing perception data regarding a selected object that is presented to the perception system;

a plurality of arrays of destination locations, each array of destination locations including horizontally extending destination locations and vertically extending destination locations, the plurality of arrays of destination locations being mutually parallel and spaced apart by a routing conveyance spacing;

a first routing conveyor unit that includes a first bidirectional conveyor thereon, the first routing conveyor unit being mounted on a first track system on a first side of the routing conveyance spacing, the first routing conveyor unit being adapted to receive a first object at the processing station and to move the first object into any destination location of the plurality of arrays of destination locations;

a second routing conveyor unit that includes a second bidirectional conveyor thereon, the second routing conveyor unit being mounted on a second track system on a second side of the routing conveyance spacing, the second routing conveyor unit being adapted to receive a second object at the processing station and to move the second object into any destination location of the plurality of arrays of destination locations; and a control system for providing that the first routing conveyor unit and the second routing conveyor unit avoid one another.

11. The object processing system of claim 10, wherein the object processing system further includes a programmable motion device that includes an end effector for grasping and moving any of the objects, said programmable motion device reaching any of the objects at an input area of the processing station.

12. The object processing system of claim 10, wherein the processing station further includes a feed conveyance system with a discharge end at which each of the first and second routing conveyor units receive the first and second objects respectively.

13. The object processing system of claim 12, wherein the perception system includes a drop perception unit that is positioned above an input end of the feed conveyor system.

14. The object processing system of claim 10, wherein the plurality of arrays of destination locations each include an associated destination bin.

15. The object processing system of claim 14, wherein the destination bins of the plurality of destination locations are provided in two sets of stacked rows of conveyor systems.

16. The object processing system of claim 15, wherein the conveyor systems each include a source end at which empty destination bins are provided, and a discharge end at which the destination bins are discharged from the system.

17. The object processing system of claim 16, wherein the source end of at least some of the conveyor systems includes a helical conveyor.

18. The object processing system of claim 16, wherein the discharge end of at least some of the conveyor systems includes a helical conveyor.

19. A method of processing objects comprising:

providing on a conveyance system a plurality of objects at a processing station;

grasping and moving a first object of the plurality of objects to a feed conveyance system of the processing station;

providing first perception data regarding the first object of the plurality of objects at the processing station;

routing the first object from the processing station in each of first horizontal and vertical directions using a first routing conveyor unit;

discharging the first object from the first routing conveyor unit in either of two mutually opposing directions from the first routing conveyor unit to a first selected destination location responsive to the first perception data;

grasping and moving a second object of the plurality of objects to the feed conveyance system of the processing station;

providing second perception data regarding the second object of the plurality of objects at the processing station;

routing the second object from the processing station in each of second horizontal and vertical directions using a second routing conveyor unit such that one of the first and second routing conveyor sections travels above the other of the first and second routing conveyor sections; and discharging the second object from the second routing conveyor unit in either of the two mutually opposing directions from the second routing conveyor unit to a second selected destination location responsive to the second perception data.

20. The method of claim 19, wherein the first and second destination locations are provided in a plurality of arrays of destination locations that are mutually parallel and spaced from one another by a routing conveyor spacing.

21. The method of claim 20, wherein the plurality of arrays of destination locations each include an associated destination bin.

22. The method of claim 21, wherein the destination bins of the plurality of destination locations are provided in two sets of stacked rows of conveyor systems.

23. The method of claim 22, wherein the method further includes loading at least one row of destination bins on a conveyor system.

24. The method of claim 23, wherein the loading at least one row of destination bins incudes using a loading helical conveyor.

25. The method of claim 22, wherein the method further includes discharging at least one row of destination bins on a conveyor system.

26. The method of claim 25, wherein the discharging at least one row of destination bins incudes using a discharge helical conveyor.

* * * * *